(12) United States Patent
Chandrasekaran et al.

(10) Patent No.: US 7,577,690 B2
(45) Date of Patent: Aug. 18, 2009

(54) MANAGING CHECKPOINT QUEUES IN A MULTIPLE NODE SYSTEM

(75) Inventors: Sashikanth Chandrasekaran, Bellmont, CA (US); Roger J. Bamford, Woodside, CA (US); William H. Bridge, Alameda, CA (US); David Brower, Alamo, CA (US); Neil MacNaughton, Los Gatos, CA (US); Wilson Wai Shun Chan, San Mateo, CA (US); Vinay Srihari, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 11/405,805

(22) Filed: Apr. 17, 2006

(65) Prior Publication Data

US 2006/0195648 A1 Aug. 31, 2006

Related U.S. Application Data

(60) Division of application No. 10/092,047, filed on Mar. 4, 2002, now Pat. No. 7,065,540, which is a continuation-in-part of application No. 09/199,120, filed on Nov. 24, 1998, now Pat. No. 6,353,836.

(60) Provisional application No. 60/274,270, filed on Mar. 7, 2001.

(51) Int. Cl.
*G06F 17/30* (2006.01)
(52) U.S. Cl. ........................ 707/204; 707/205; 707/202; 711/118; 711/119; 711/130; 711/151; 711/158; 714/6; 714/20; 714/719

(58) Field of Classification Search ................. 707/205, 707/206, 202, 204; 711/118, 119, 130, 142, 711/143, 151, 158; 714/6, 20, 719
See application file for complete search history.

(56) References Cited

U.S. PATENT DOCUMENTS 4,438,494 A 3/1984 Budde et al.
(Continued)

FOREIGN PATENT DOCUMENTS

EP 0 471 282 A2 2/1992
(Continued)

OTHER PUBLICATIONS

European Patent Office, "Communication pursuant to Article 94(3) EPC", Foreign application No. 02 748 408.8, recieved Dec. 20, 2007, 7 pages.

(Continued)

*Primary Examiner*—Jean M Corrielus
(74) *Attorney, Agent, or Firm*—Hickman Palermo Truong & Becker LLP

(57) ABSTRACT

Techniques are provided for managing caches in a system with multiple caches that may contain different copies of the same data item. Specifically, techniques are provided for coordinating the write-to-disk operations performed on such data items to ensure that older versions of the data item are not written over newer versions, and to reduce the amount of processing required to recover after a failure. Various approaches are provided in which a master is used to coordinate with the multiple caches to cause a data item to be written to persistent storage. Techniques are also provided for managing checkpoints associated with the caches, where the checkpoints are used to determine the position at which to begin processing recovery logs in the event of a failure.

6 Claims, 14 Drawing Sheets

U.S. PATENT DOCUMENTS

| | | | |
|---|---|---|---|
| 4,814,971 | A | 3/1989 | Thatte |
| 5,193,162 | A | 3/1993 | Bordsen et al. |
| 5,276,835 | A | 1/1994 | Mohan et al. |
| 5,276,848 | A | 1/1994 | Gallagher et al. |
| 5,280,611 | A | 1/1994 | Mohan et al. |
| 5,285,528 | A | 2/1994 | Hart |
| 5,287,473 | A | 2/1994 | Mohan et al. |
| 5,297,269 | A | 3/1994 | Donaldson et al. |
| 5,327,556 | A | 7/1994 | Mohan et al. |
| 5,454,108 | A | 9/1995 | Devarakonda et al. |
| 5,465,328 | A | 11/1995 | Dievendorff et al. |
| 5,524,205 | A | 6/1996 | Lomet et al. |
| 5,659,682 | A | 8/1997 | Devarakonda et al. |
| 5,680,576 | A | 10/1997 | Laudon |
| 5,829,032 | A | 10/1998 | Komuro et al. |
| 5,832,516 | A | 11/1998 | Bamford et al. |
| 5,903,910 | A | 5/1999 | Tran et al. |
| 5,924,096 | A | 7/1999 | Draper et al. |
| 5,933,838 | A | 8/1999 | Lomet |
| 5,933,849 | A | 8/1999 | Srbljic et al. |
| 5,966,706 | A | 10/1999 | Biliris et al. |
| 5,987,477 | A | 11/1999 | Schmuck et al. |
| 5,987,506 | A * | 11/1999 | Carter et al. ............... 709/213 |
| 5,999,940 | A | 12/1999 | Ranger |
| 6,012,085 | A | 1/2000 | Yohe et al. |
| 6,026,474 | A | 2/2000 | Carter et al. |
| 6,032,188 | A | 2/2000 | Mairs et al. |
| 6,052,758 | A | 4/2000 | Crockett et al. |
| 6,067,550 | A | 5/2000 | Lomet |
| 6,085,198 | A | 7/2000 | Skinner et al. |
| 6,092,157 | A | 7/2000 | Suzuki |
| 6,115,715 | A | 9/2000 | Traversat et al. |
| 6,151,607 | A | 11/2000 | Lomet |
| 6,154,811 | A | 11/2000 | Srbljic et al. |
| 6,243,814 | B1 | 6/2001 | Matena |
| 6,253,273 | B1 | 6/2001 | Blumenau |
| 6,256,712 | B1 | 7/2001 | Challenger et al. |
| 6,279,084 | B1 | 8/2001 | VanDoren et al. |
| 6,353,836 | B1 | 3/2002 | Bamford et al. |
| 6,374,264 | B1 | 4/2002 | Bohannon et al. |
| 6,434,555 | B1 | 8/2002 | Frolund et al. |
| 6,449,623 | B1 | 9/2002 | Bohannon et al. |
| 6,453,356 | B1 | 9/2002 | Sheard et al. |
| 6,453,404 | B1 | 9/2002 | Bereznyi et al. |
| 6,490,594 | B1 | 12/2002 | Lomet |
| 6,633,891 | B1 | 10/2003 | Bamford et al. |
| 6,647,510 | B1 | 11/2003 | Ganesh et al. |
| 6,668,295 | B1 | 12/2003 | Chan |
| 6,816,873 | B2 | 11/2004 | Cotner et al. |
| 6,832,120 | B1 | 12/2004 | Frank et al. |
| 6,915,387 | B1 | 7/2005 | Huffman et al. |
| 7,120,651 | B2 * | 10/2006 | Bamford et al. ............. 707/201 |
| 7,475,207 | B2 * | 1/2009 | Bromling et al. ............ 711/162 |
| 2004/0225742 | A1 | 11/2004 | Loaiza et al. |
| 2005/0149540 | A1 | 7/2005 | Chan et al. |

FOREIGN PATENT DOCUMENTS

| | | | |
|---|---|---|---|
| EP | 0 499 422 | A2 | 8/1992 |
| EP | 0 657 813 | A1 | 6/1995 |
| EP | 0 750260 | A2 | 12/1996 |
| JP | 9-6546 | | 1/1997 |
| JP | 9-138754 | | 5/1997 |
| JP | 9-259098 | | 10/1997 |
| WO | WO 91/03024 | A1 | 3/1991 |
| WO | WO 99/41664 | A1 | 8/1999 |

OTHER PUBLICATIONS

Claims, Foreign application No. 02 748 408.8, 6 pages.
Japanese Patent Office, "Notice of Grounds of Rejection", patent application No. 572008/2002, received Feb. 29, 2008, 6 pages.
Claims, patent application No. PCT/US02/06981, 6 pages.
Hirayama et al., "Highly Reliable Server with QRM", Technical report of IEICE, Japan, The Institute of Electronics, Information and Communication Engineers, Dec. 6, 1996, vol. 96, No. 397, p. 65-72 (English Translation submitted named "Hirayamaenglish.pdf" 3 pages).
Ahmed, Rana Ejaz, et al., "Cache-Aided Rollback Error Recovery (CARER) Algorithms for Shared-Memory Multiprocessor Systems," 1990, IEEE, pp. 82-88.
Cox, Alan L. et al., "Adaptive Cache Coherency for Detecting Migratory Shared Data," 1993, IEEE, pp. 98-108.
Dahlin, Michael Donald, "Serverless Network File Systems," 1995, pp. 1-166.
Feeley, Michael J., et al., "Implementing Global Memory Mangement in a Workstation Cluster," SIGOPS '95, Dec. 1995, XP 000584826, pp. 201-212.
IBM Corporation, "Memory Queue Priority Mechanism for a RISC Processor," IBM Technical Disclosure Bulletin, vol. 37, No. 06A, Jun. 1994, XP 00455787, pp. 319-332.
Josten, J. W. , et al., "DB2's Use of the Coupling Facility for Data Sharing", IBM Systems Journal, vol. 36, No. 2, 1997, 25 pages.
Kaxiras, Stefanos, et al., "Improving CC-NUMA Performance Using Instruction-Based Prediction," 1999, IEEE, pp. 161-170.
Kermarrec, Anne-Marie, et al., "A Recoverable Distributed Shared Memory Integrating Coherence and Recoverability," Jun. 27, 1995, IEEE, XP 000597800, pp. 289-298.
Kjetil, Norvag, "Issues in transaction-time temporal object database systems", Oct.-Dec. 2001, Journal of Database Management v12, n4, pp. 40-51.
Mohan, C., et al., Research Report #91A002286 entitled "Recovery and Coherency-Control Products for Fast Intersystem Page Transfer and Fine-Granularity Locking in a Shared Disks Transaction Environment", Data Base Technology Institute, IBM Almaden Research Center, Mar. 15, 1991 (31pgs).
Mohan, C, et al., "Solutions to Hot Spot Problems in a Shared Disks Transaction Enviroment", IBM Research Report RJ8281, Data Base Technology Institute, IBM Alamaden Research Center, Aug. 1991, 25 pages.
Mohan, C et al., "Efficient Locking and Caching of Data in the Multisystem Shared Disks Transaction Environment", Proc. 3rd International Conference on Extending Database Technology, Viennia, Mar. 1992, pp. 453-468.
Mohan, C, et al., "Efficient Locking and Caching of Data in the Multisystem Shared Disks Transaction Environment", Data Base Technology Institute, IBM Almaden Research Center, RJ 8301, Aug. 1991, 20 pages.
Mohan, C, et al., "Data Base Recovery in Shared Disks and Client-Server Architectures", Proc. 12th International Conference on Distributed Computing Systems, Yokohama, Jun. 1992, pp. 310-317.
Mohan, C, et al., "Data Base Recovery in Shared Disks and Client-Server Architectures", IBM Research Report RJ8685, Data Base Technology Institute, IBM Almaden Research Center, Mar. 1992, 20 pages.
Mohan, C., et al., Abstracts of Some of C. Mohan's Papers and Patents, Updated on Jun. 13, 2001, www.almaden.ibm.com/u/mohan/aries_papers.html, (pp. 1-38), accessed Jul. 24, 2001.
Mohan, C., et al., "A Case Study of Problems in Migrating to Distributed Computing: Data Base Recovery Using Multiple Logs in the Shared Disks Environment", IBM Research Report RJ7343, Database Technology Institute, IBM Almaden Research Center, Mar. 1990, 20 pages.
Mohan, C., et al., "Recovery and Coherency-Control Protocols for Fast Intersystem Page Transfer and Fine-Granularity Locking in a Shared Disks Transaction Environment", Proceedings of the 17$^{th}$ International Conference on Very Large Data Bases, Barcelona, Sep. 1991, (pp. 193-207).
Molesky, Lory D. et al., "Database Locking Protocols for Large-Scale Cache-Coherent Shared Memory Multiprocessors: Design, Implementation and Performance," Jun. 6, 1995, pp. 1-24.
Molesky, Lory D et al., "Efficient Locking for Shared Memory Database Systems," Mar. 1994, 28 pages.

* cited by examiner

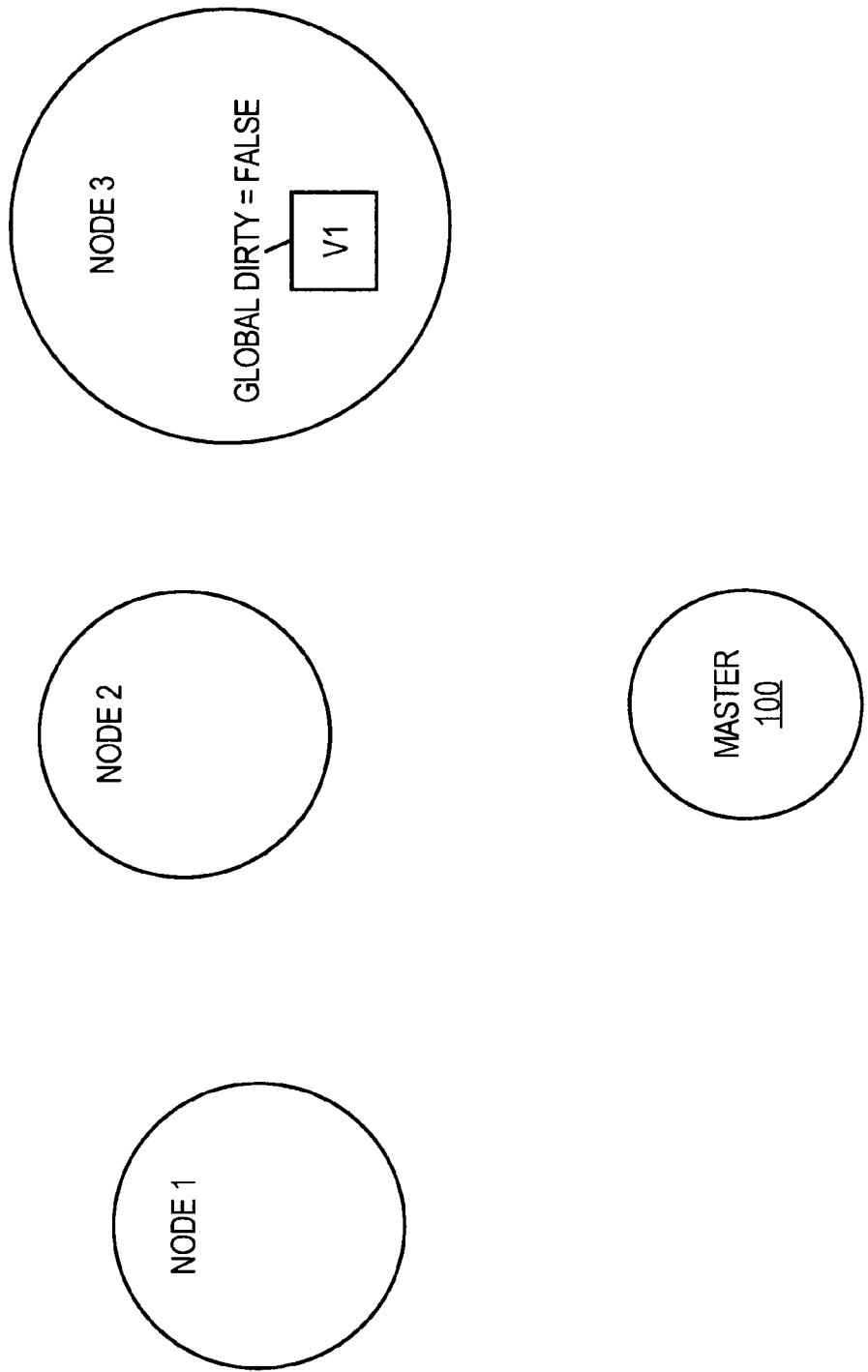

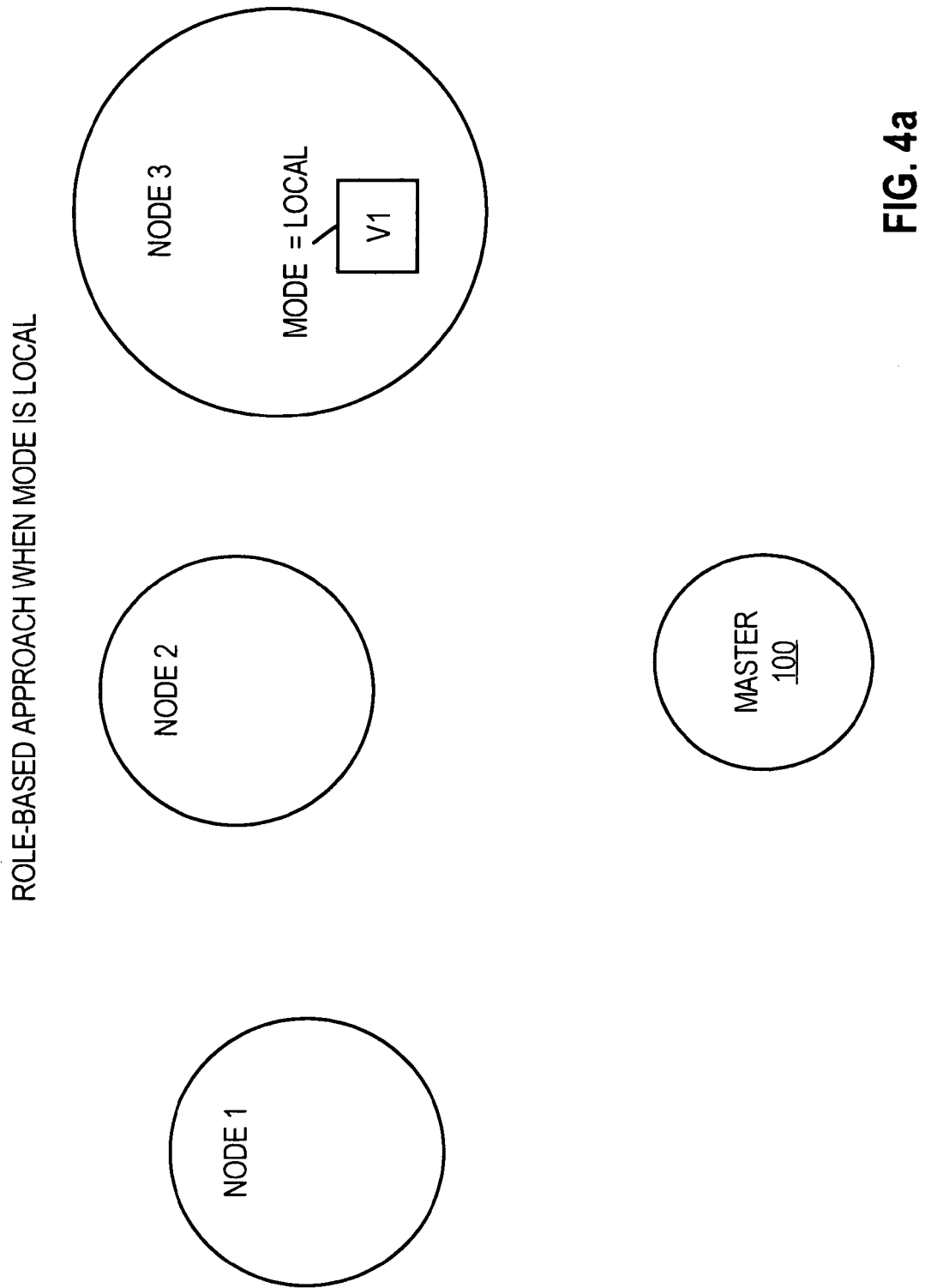

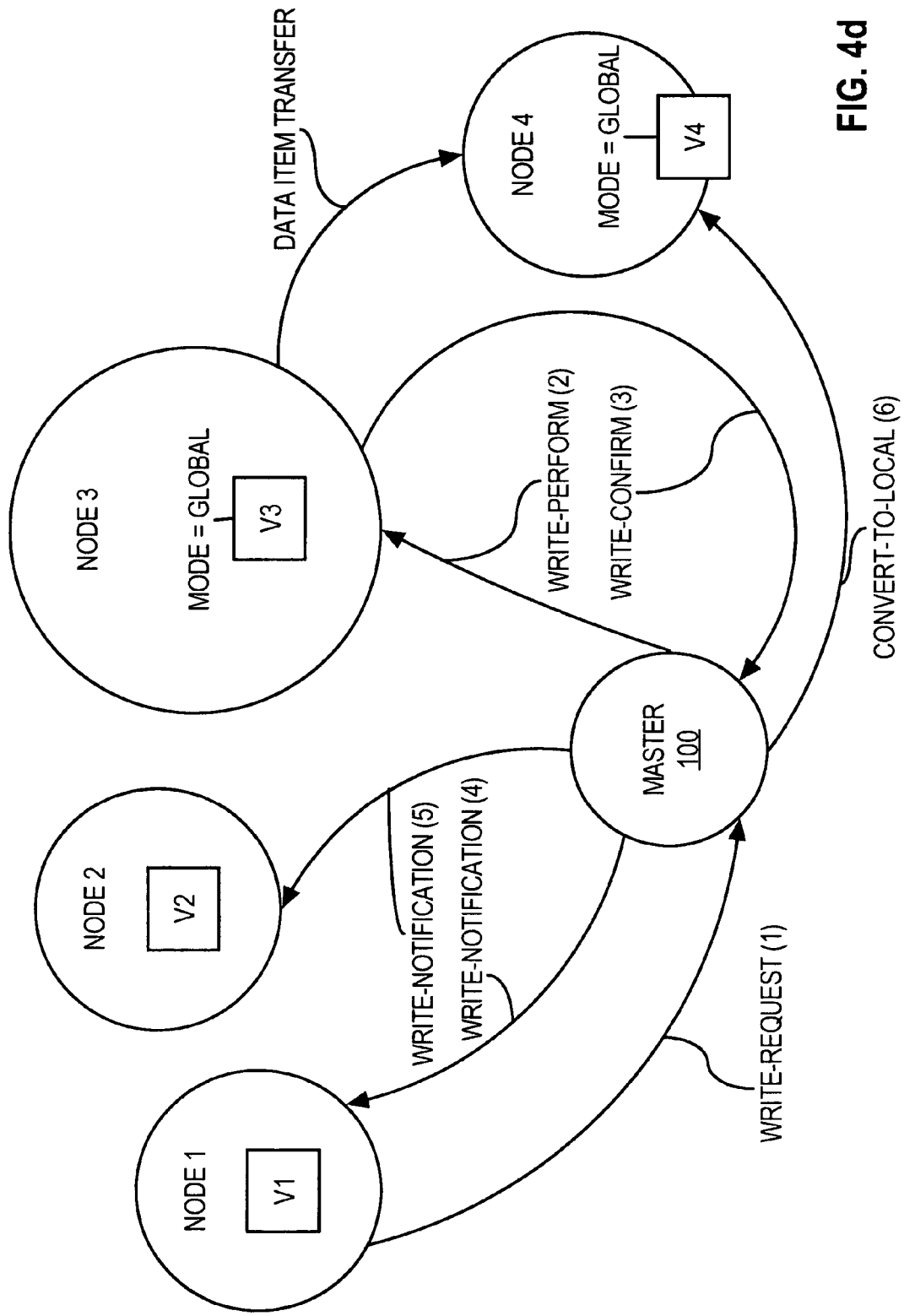

MANAGING CHECKPOINT QUEUES IN A MULTIPLE NODE SYSTEM

RELATED APPLICATION; PRIORITY CLAIM

This patent application is a divisional of and claims priority from U.S. patent application Ser. No. 10/092,047, filed Mar. 4, 2002, now U.S. Pat No. 7,065,540, entitled MANAGING CHECKPOINT QUEUES IN A MULTIPLE NODE SYSTEM which is a continuation-in-part of from U.S. patent application Ser. No. 09/199,120, filed Nov. 24, 1998, now U.S. Pat. No. 6,353,836, entitled METHOD AND APPARATUS FOR TRANSFERRING DATA FROM THE CACHE OF ONE NODE TO THE CACHE OF ANOTHER NODE, and naming as inventors Roger J. Bamford and Boris Klots, the content of which is hereby incorporated by reference in its entirety.

This patent application is also related to and claims priority from U.S. Provisional Patent Application No. 60/274,270, filed Mar. 7, 2001, entitled METHODS TO PERFORM DISK WRITES IN A DISTRIBUTED SHARED DISK SYSTEM NEEDING CONSISTENCY ACROSS FAILURES, the content of which is hereby incorporated by reference in its entirety.

This patent application is also related to U.S. patent application Ser. No. 10/091,618, filed Mar. 4, 2002, entitled METHODS TO PERFORM DISK WRITES IN A DISTRIBUTED SHARED DISK SYSTEM NEEDING CONSISTENCY ACROSS FAILURES, the content of which is hereby incorporated by reference in its entirety.

FIELD OF THE INVENTION

The present invention relates to performing disk writes and, more particularly, to coordinating the writing of dirty data items in systems that allow dirty versions of a data item to reside in the caches of multiple nodes.

BACKGROUND OF THE INVENTION

One way to improve scalability in database systems is to allow multiple nodes to concurrently read and modify data in shared storage. Each node has a cache to hold data in volatile main memory and is backed up by non-volatile shared disk storage. A global lock manager (GLM) or a distributed lock manager (DLM) is used to maintain cache coherency between nodes. To provide recovery from node failures that erase the contents of main memory, the popular Write-Ahead-Logging (WAL) protocol is used. For performance reasons, each node has a private redo log in which changes are recorded. To reduce the amount of changes in the redo log that need to be scanned after a node failure, incremental or periodic checkpoints are typically taken that guarantee that all changes in a data item prior to the checkpoint need not be reapplied to the data item in non-volatile storage.

Concurrency Control

Concurrency control between transactions running either on the same node or different nodes is implemented through global transactional page-level locks or row-level locks. The transaction system can use either the force policy, where the data items (such as pages/blocks) modified by the transaction are written to stable storage during transaction commit, or use the no-force policy where only the transactions' changes in the redo log are forced at transaction commit. Use of the force policy with page level locks implies that the blocks are modified only by one node (in fact, only by one transaction) and can be dirtied in only one system's cache at any point. In all other combinations (i.e. row-level locks with force policy, page-level locks with no-force, and row-level locks with no-force) the data items can be modified in multiple systems and a cache coherency mechanism is needed.

The most general case is row-level locks with the no-force data item management policy. For the purpose of explanation, the examples given hereafter will be given in the context of systems that use row-level locks with the no-force data item management policy. However, the techniques described herein are not limited to that context.

Checkpoint Queues

When a transaction commits, data that reflects the changes made by the transaction must be stored on persistent storage. In some systems, redo records that indicate the changes made by a transaction have to be persistently stored at commit time, but the actual writing of the modified data items themselves can be delayed. A data item that (1) contains changes, and (2) has not yet been persistently stored, is referred to as a "dirty data item". In general, the more dirty data items that reside in a node, the longer the recovery time will be if the node fails. Therefore, to ensure that the recovery time is not unacceptably long, a node may maintain a checkpoint queue.

Checkpoint queues contain entries that identify dirty data items. The entries in the queue are ordered based on the order of corresponding redo records in a persistently stored redo log. In the event of a failure, the redo log must be processed starting with the redo record that corresponds to the entry that was at the head of the checkpoint queue.

When a dirty data item is written to persistent storage, the entry for that data item is removed from the checkpoint queue. When the entry that is at the head of the checkpoint queue is removed from the checkpoint queue, the point within the redo log at which recovery processing must begin changes, resulting in an "advance" of the checkpoint. The further the checkpoint has advanced in the redo log at the time of a failure, the less work has to be done to recover from the failure. Consequently, nodes typically attempt to write to persistent storage the dirty data items identified by the entries at the head of their checkpoint queue. However, as shall be described in greater detail hereafter, coordinating the writing of dirty data items is particularly important when it is possible for dirty versions of the same data item to reside in the caches of multiple nodes.

Transfer of Data Items Through Shared Persistent Storage

When data items can be modified concurrently by multiple systems, a mechanism is needed to coordinate the writing of the modified data items to stable shared persistent storage. In some systems, this problem is simplified by using the stable shared persistent storage as the medium for transferring the modified data items from one node to another. When a data item that is dirty in a node is needed for modification in a different node, the data item is first written to the shared persistent storage before granting the page lock to the node that wants to modify the dirtied data item. The same write-to-persistent storage and read-from-persistent storage sequence is used when a different node needs to read the current version of the modified data item.

Transfer of Data Items Through Inter-Connect

In systems that use nonvolatile storage as the medium through which they transfer data items between nodes, it is not necessary to coordinate the writing of dirty data items among the different nodes. Each node can use the conventional mechanism for writing out dirty data items and performing checkpoints.

In some systems, the modified data item is sent to the requesting node without writing the data item to the persistent storage when the requesting node only needs a consistent snapshot version of the modified data item. Hence, with these coherency control mechanisms, although multiple transactions in different nodes can modify the same data item using row-level locks before transaction commit, any database data item is dirty in only one node's cache. Consequently, when a node fails, only that node's redo logs need to be scanned from the checkpoint record in that node to the end of its redo log to recover the database. Further, when multiple nodes fail, each node's redo logs can be scanned and applied in sequence to recover the database, i.e. there is no need for merging changes from multiple redo logs.

However, to improve data item transfer latency, from a node that has an exclusive lock and that has potentially modified the data item, to a node that requests the same data item for exclusive use or a current version for read, it is desirable to directly transfer the data item from the main memory of one node to the main memory of another without first writing the data item to persistent storage. When a dirty data item is transferred from one node to another, a copy of the data item, known as a past image (PI) may or may not be retained in the sending node.

When nodes are allowed to transfer dirty data items without storing them to persistent storage, the writing of the dirty data items must be coordinated between the various nodes. If no coordination occurs, a node that has transferred a dirty data item may desire to advance its checkpoint by writing the dirty data item to persistent storage. However, if some other node has already written a more recent version of the data item to persistent storage, then writing the dirty data item to persistent storage may corrupt the integrity of the data.

In addition, checkpoints cannot be advanced unless dirty data items are written to disk. If a node does not retain dirty versions of data items that the node sends to other nodes, then the node must somehow coordinate write-to-disk operations with the other nodes.

Further, for a system to be scalable, the number of write-to-disk operations performed by the system should not be a function of the number of nodes in the system. Rather, the number of write-to-disk operations should simply reflect the number of changes actually made to data items within the system.

Based on the foregoing, it is clearly desirable to provide techniques for coordinating the writes of dirty data items in systems in which it is possible for dirty versions of the same data item to reside in more than one volatile memory.

SUMMARY OF THE INVENTION

Techniques are provided for managing caches in a system with multiple caches that may contain different copies of the same data item. Specifically, techniques are provided for coordinating the write-to-disk operations performed on such data items to ensure that older versions of the data item are not written over newer versions, and to reduce the amount of processing required to recover after a failure. Various approaches are provided in which a master is used to coordinate with the multiple caches to cause a data item to be written to persistent storage. Such approaches include, but are not limited to, direct write approaches, indirect write approaches, owner-based approaches, and role-based approaches. Techniques are also provided for managing checkpoints associated with the caches, where the checkpoints are used to determine the position at which to begin processing recovery logs in the event of a failure.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3a is a block diagram illustrating how write-do-disk operations are coordinated in an owner-based write approach when the global dirty flag is false, according to an embodiment of the invention;

FIG. 4a is a block diagram illustrating how write-do-disk operations are coordinated in a role-based write approach when the mode is local, according to an embodiment of the invention.

FIG. 4d is a block diagram illustrating how write-do-disk operations are coordinated in a role-based write approach when a transfer is performed during a write operation, according to an embodiment of the invention;

DETAILED DESCRIPTION OF THE INVENTION

Figure 1:
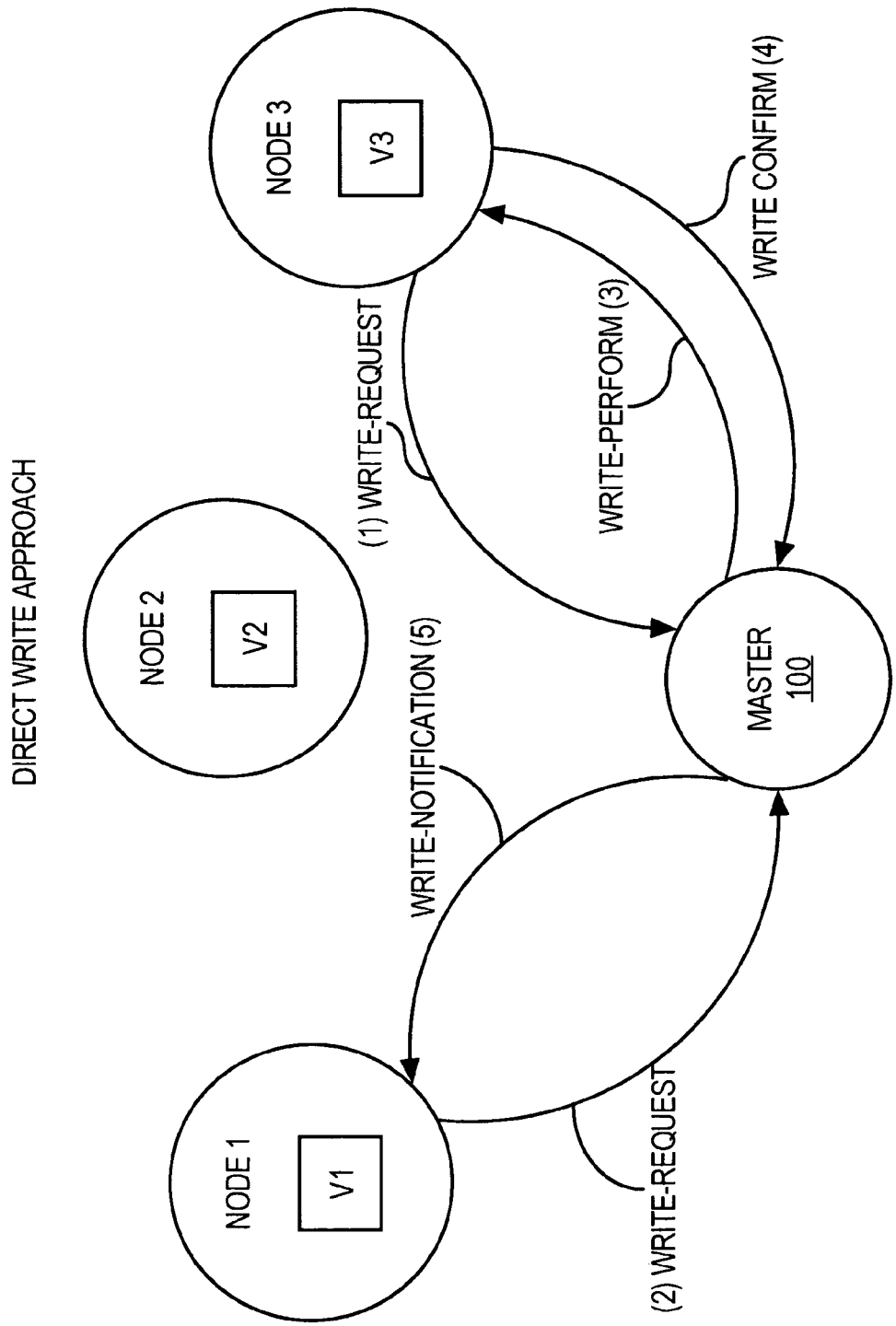
FIG. 1 is a block diagram illustrating how write-do-disk operations are coordinated in a direct write approach according to an embodiment of the invention.

A method and apparatus for coordinating the writing of dirty data items is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Optimizing Systems that Use a Persistent Storage as Medium for Transfer

In systems that use a persistent storage as the medium for transferring data items between nodes, the latency of transferring a data item from one node to another may be reduced by modifying the database cache writing subsystem to give higher priority to writing data items that other nodes are waiting to read or write. This can be accomplished by having a separate queue (a "ping queue") for dirty data items that need to be written because other nodes are waiting to read or modify them. The dirty data items can be moved to the ping queue on demand when a lock manager (which may be either a distributed lock manager DLM or a global lock manager GLM) sends a message to the holding node asking for the holding node to release its lock on the data item.

According to another approach, the latency of transferring a data item from one node to another may be reduced by maintaining a "forced-write" count in each data item header or data item control block. The forced-write count is incremented whenever a write is performed in order to transfer a data item to another node. The persistent storage writing subsystem maintains a high priority queue of dirty data items whose forced-write count is higher than a certain threshold. Such a queue is used to allow those data items to be written more frequently than other dirty data items that are not frequently shared between nodes. In addition, the latency of lock transfer between nodes is improved because the database cache writing subsystem has eagerly written out dirty data items in anticipation that the locks on these data items need to be released.

However, even when optimized in this manner, systems that use a shared persistent storage as the medium for transferring data items between nodes suffer the overhead associated with writing the data items to persistent storage. The techniques described hereafter relate to systems in which data items, including dirty data items, can be transferred between nodes without first being written to persistent storage.

Correctness and Scalability

In systems that allow dirty data items to be transferred between caches without first being stored on persistent storage, there is a need to coordinate the writes of the dirty data items in the different per-node caches for the sake of correctness as well as scalability. Correctness requires that when a node completes a checkpoint (i.e. records a starting point from which changes may need to be applied from its redo log after a failure), a version of every data item that contains changes that were committed prior to the checkpoint has been written to the non-volatile persistent storage storage. Further, two nodes must not be allowed to write a data item to persistent storage at the same time (since they may clobber each other's changes) and a node must not be allowed to write an older version of a data item over a more recent version.

Scalability requires that a persistent storage write of a data item covers as many changes as possible even if the changes were made by different nodes. For availability reasons, a database system may wish to limit the amount of redo log that needs to be scanned and possibly reapplied after node failure. Hence, the number of database writes could be proportional to the number of changes made to data items, but should not be proportional to the number of nodes that are making these changes.

Functional Overview

Various techniques are provided for coordinating the writing of dirty data items to persistent storage in systems that allow a dirty version of the same data item to reside in multiple caches. According to one technique, the coordination is performed using a master assigned to the data item. According to one embodiment, the master used to coordinate the writing of dirty versions of the data item is the same entity that is assigned to manage the locks that govern access to the data item. In such an embodiment, the master would typically be a component of a lock management system, such as a lock manager that belongs to either a distributed or global lock management system.

In one embodiment, a node that desires to write a dirty data item to persistent storage sends a persistent storage-write request to the master assigned to the data item. The master may (1) grant the requesting node permission to perform the write, or (2) inform the requesting node that another node has already written to persistent storage a version that is at least as recent as the dirty version stored in the requesting node.

In another embodiment, the master may also respond by sending a "write-perform" message to ask a node other than the requesting node to write to persistent storage a version of the data item that is at least as recent as the dirty version stored in the requesting node. After the other node sends to the master a "write-confirm" message that the write has been performed, the master sends a "write-notification" message to inform the requesting node that another node has already written to persistent storage a version of the data item that is at least as recent as the dirty version stored in the requesting node.

Once a particular version of a data item has been written to persistent storage, the dirty versions of the data item that are the same as or older than that particular version are "covered" by the writing of the particular version. Covered versions of a data item no longer need to be (and should not be) written to persistent storage. The nodes that contain covered versions are referred to herein as the "interested" nodes.

In addition to informing the requesting node that a data item has been written to persistent storage, the master may send write-notification messages to inform all of the interested nodes that the data item was written to persistent storage. The write-notification messages to the other interested nodes may be sent immediately upon receiving confirmation that the data item was written to persistent storage, or delayed until some other event.

In another embodiment, to avoid the need for every node to ask the master every time the node wants a dirty data item to be written to persistent storage, the master may grant to a node "ownership permission" for the data item. While a node holds the ownership permission for the data item, the node is free to write the data item to persistent storage without sending a write-request message to the master of the data item. The ownership permission may be granted implicitly with ownership of the exclusive lock, or it may be granted separately from and independent of the grant of an exclusive lock.

According to one embodiment, a "global dirty" flag is maintained for a data item. The global dirty flag is set to TRUE if a node transfers a dirty version of the data item to another node. If the global dirty flag is set to TRUE when an owner writes a data item to persistent storage, then the owner sends a write-confirm message to the master. The master may then send write-notification messages to the interested nodes. On the other hand, if the global dirty flag is set to FALSE, then the owner need not send a write-confirm message to the master when the owner writes the data item.

Direct Write Approach

According to the direct write approach, the writing to persistent storage of a dirty data item is coordinated using the master assigned to the data item. In particular, a node that desires to write a dirty data item to persistent storage sends a write-request message to the master assigned to the data item. The master may (1) grant the requesting node permission to perform the write, or (2) inform the requesting node that another node has already written to persistent storage a version that is at least as recent as the dirty version stored in the requesting node.

More specifically, when a dirty data item is "pinged out" of a node's cache, i.e. another node requires a current version of the same data item for read (S lock) or write (X lock), the status of the data item in the sending node's cache is changed to PI. The data item still remains in the dirty or checkpoint queue. When a clean data item is pinged out, the data item can be either marked free or can remain in the cache to satisfy consistent snapshot reads.

The master of the data item records the version number of the data item when the data item is pinged out. Typically this version number is a log sequence number (LSN), a system commit number (SCN) or a globally unique timestamp that can be used to correlate the version of the data item with the changes in the redo log. The checkpoint or the cache writing subsystem will eventually need to write out the PI (or some successor thereof) since the data item is still on the dirty or checkpoint queue.

According to the direct write approach, a message is sent to the master which would either return with a status that a more recent version of the data item has been written, or grant write permission to the requesting node. Further write requests for the same data item from other nodes are queued until the writing node responds to the lock manager with a write completion status. After a PI is written to persistent storage, the master of the data item records the version number of the PI as the version that is currently on persistent storage.

Referring to FIG. 1, it is a block diagram illustrating a system that employs the direct write approach. Nodes 1, 2 and 3 have stored in their caches versions V1, V2, and V3, respectively, of a particular data item. Assume that V3>V2>V1, where A>B means that A is a newer version of the data item than B.

Master 100 is the master assigned to the data item. In the scenario illustrated in FIG. 1, nodes 1 and 3 send write-requests to master 100. To prevent multiple nodes writing the same data item at the same time, master 100 may contain, for example, a write-request queue for each data item. The write requests received for the data item are stored in the write-request queue and processed serially by the master. In the illustrated example, master 100 processes the write-request from node 3 first, while the write-request from node 1 remains in the write-request queue. Master 100 responds to the write-request of node 3 by sending node 3 a write-perform message that grants node 3 permission to write V3 to persistent storage.

While the write-request has been granted to node 3, master 100 does not grant write-to-persistent storage permission to any other node. Therefore, the write-request from node 1 remains pending in the write-request queue.

After node 3 has written V3 to persistent storage, node 3 sends master 100 a write confirm message indicating that the write-to-persistent storage operation has been completed, and that the write-to-persistent storage permission is being released by node 3. Because V3 was newer than V1 and V2, V1 and V2 were covered by the writing of V3.

Master 100 then proceeds to process the next write-request in the queue. In the present example, master 100 processes the write-request from node 1. The write-request of node 1 is a request to write V1. Because V1 was already covered by the write of V3, master 100 sends a write-notification message to node 1 indicating that V1 is already covered. In response to the write-notification message, node 1 removes the entry for V1 from its checkpoint queue without writing V1 to persistent storage. Because node 1 now knows that V1 is covered, node 1 need not retain a copy of V1 in memory.

According to one embodiment, node 2, which contains V2 that was covered by the writing of V3, is not sent a write-notification message until node 2 sends master 100 a write-request for V2.

Indirect Write Approach

Using the direct write approach, each node sends a write-request message for each entry in the node's checkpoint queue. In some cases, the node will receive a write-perform message in response to the write-request. When a write-perform message is received, the requesting node must perform a write operation. In other cases, the requesting node will receive a write-notification in response to the write-request. When a write-notification message is received, the requesting node does not need to perform the write operation.

The indirect write approach attempts to increase the percentage of write-requests that are answered with write-notification messages. To achieve this, master 100 is selective with respect to the node that is asked to perform a write operation. In particular, master 100 may respond to a write-request message from one node by sending a write-perform message to another node. The node to which a write-perform message is sent may be selected based on a variety of factors, including the recentness of the version of the data item stored in the cache. According to one embodiment, master 100 always sends the write-perform message to the node that contains the current version of the data item, regardless of the node that sent the write-request message.

More specifically, according to one embodiment, the master forwards write requests to either the node that has the highest version among the past images, or preferably the exclusive lock (X) holder (which would have the current version of the data item). Forwarding the write request to the highest PI rather than to the exclusive lock holder leaves the current data item continuously available for modification.

While a data item is being written to persistent storage, it may not be modified; therefore, to write a current data item that may be modified further, it is necessary either to lock it to prevent modifications, or to "clone" it to have changes made to a different copy. Locking is undesirable; if cloning is possible, it is preferable to direct the write request to the node that has the current data item (i.e X lock or S lock).

Having the current version of the data written to persistent storage allows a persistent storage write to cover as many changes as possible. When the write to persistent storage completes, a message is sent to the master with a write completion status and the version number of the data item that was written. The master records the version number that is on persistent storage and sends write notification messages to all nodes that have a PI version of the data item that is now covered by the persistent storage write. When a node receives a write notification, the node can correctly advance its checkpoint record and release the PI data items, provided all data items on its dirty or checkpoint queue prior to the checkpoint record have either been written to persistent storage or have received write notifications from the master due to writes of the same data item in other nodes. The master logically maintains a queue of write requests when a data item is being written, but only needs to record the version number of the highest write request that it has received.

Figure 2:
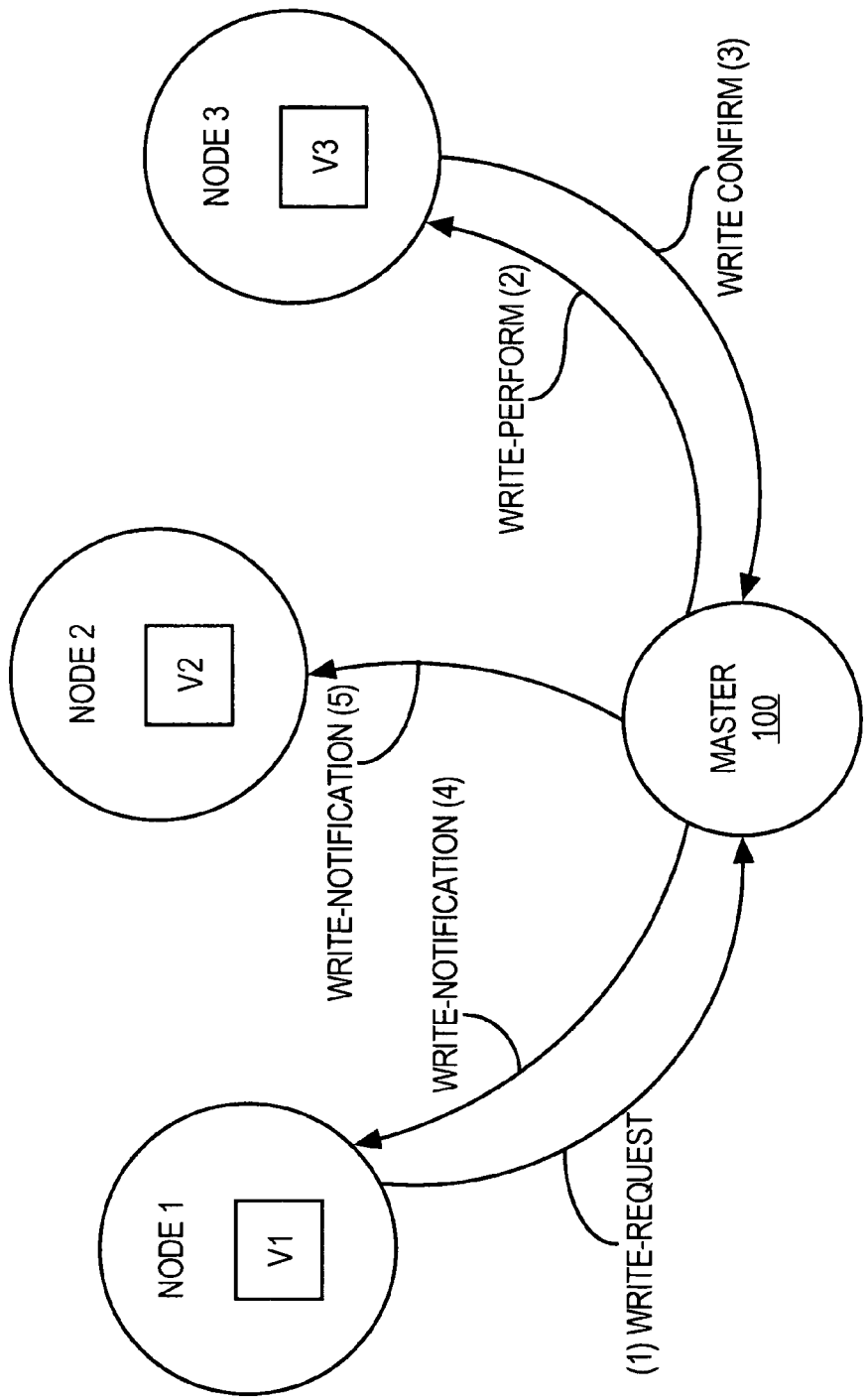
FIG. 2 is a block diagram illustrating how write-do-disk operations are coordinated in an indirect write approach according to an embodiment of the invention.

For example, in the scenario illustrated in FIG. 2, node 3 has not sent a write-request message for V3 to master 100. However, in response to the write-request message from node 1 to write version V1 of the data item, master 100 selects node 3 to be the node to write the data item. Node 3 responds by writing V3 of the data item, and sending a write-message to master 100. Master 100 then sends a write-notification message to node 1.

Because node 3 was selected for writing V3 to persistent storage, both V1 and V2 are covered. In contrast, if (according to the direct write approach) master 100 had given node 1 permission to write V1, then V2 and V3 would not be covered. When it came time to write V2 and V3 to persistent storage, separate write operations would have to be performed.

The indirect write approach also attempts to reduce the number of write-request messages that have to be sent to master 100 by preemptively sending write-notification messages to interested nodes that have not sent write-request messages, as well as to those that have. For example, in the scenario illustrated in FIG. 2, using the indirect write approach, master 100 would also send a write-notification to node 2, even though node 2 has not sent a write-request for V2. According to one embodiment, master 100 sends write-notification messages to all of the interested nodes.

When an interested node receives a write-notification, it removes the entry for the corresponding version of the data item from its checkpoint queue. Using the indirect write approach, many of the entries in the checkpoint queue may be removed in this manner before a write-request would have to be sent for the entries. Consequently, the number of write-request messages that are sent by a node may be significantly less than the number of entries that were placed in its checkpoint queue.

Owner-Based Writes

In both the indirect write approach and the direct write approach, write-requests messages are sent to the master of the data item even when the data item has been dirtied only in one node's cache. In many database systems a significant fraction of the database working set may be partitioned between the nodes either by partitioning the internal persistent storage structures between the nodes (e.g. separate data item freelists for each node) or by application level routing of transactions to nodes. In such systems, a data item will frequently have been dirtied in only one node's cache. The owner-based write approach avoids the need to send write-requests under these circumstances.

The owner-based write approach causes all writes of a data item to be made by the node that is currently designated to be the "owner" of the data item. In contrast to the direct and indirect write approaches, when the owner of the data item desires a version of the data item to be written, the owner is allowed to write the data item to persistent storage without sending a write-request message to the master of the data item.

Various factors may be used to select the node that acts as the owner of the data item. According to one embodiment, the owner for a data item is selected based on the following rules:

(1) if a node has been granted the exclusive lock for the data item, then that node is considered the owner of the data item;

(2) if there are no exclusive lock holders, i.e. there are multiple share lock (S) holders, then the node that had the exclusive lock on the data item most recently is selected as the owner of the data item; and (3) if the data item has never been dirtied by any node, then there is no owner for the data item.

In a node that is the owner of a data item, the data item is linked to the node's checkpoint queue even when it may not have been dirtied in that node.

After the owner of the data item writes the data item to persistent storage, the owner determines whether the data item was "globally dirty". A data item is globally dirty if any modifications made by any node other than the owner have not been saved to persistent storage by that node. If the data item was globally dirty, then the owner sends a write-confirm message to the master. The master may then send write-notifications to the interested nodes. If the data item was not globally dirty, then the owner need not send a write-confirm message to the master.

Various techniques may be used to allow the owner of a data item to determine whether the data item was globally dirty. According to one embodiment, a global dirty flag is associated with the data item. When a node sends a dirty version of a data item to another node without writing the data item to persistent storage, the sending node sets the global dirty flag of the data item to TRUE. To determine whether a data item is globally dirty, the owner merely needs to inspect the global dirty flag associated with the data item. If the version of the data item that is written to persistent storage is either (1) the current version of the data item, or (2) the latest PI version, then the owner sets the global dirty flag to FALSE after writing the data item to persistent storage.

The global dirty flag of a data item may be stored in a variety of ways. For example, when the data item is a data item in a database system, the global dirty flag may be stored in (1) the block header of the block that stores the data item, (2) the data item control block of the data item, (3) the lock structures in a local lock manager when the lock is granted to the new owner of the data item, etc.

Referring to FIG. 3a, it illustrates a scenario in which the owner of a data item (node 3) desires to write a data item to persistent storage, where the global dirty flag is set to FALSE. As can be seen in FIG. 3a, under these circumstances, node 3 need not ask permission from master 100. In addition, node 3 need not notify master 100 that the write-to-persistent-storage operation was performed.

Figure 3B:
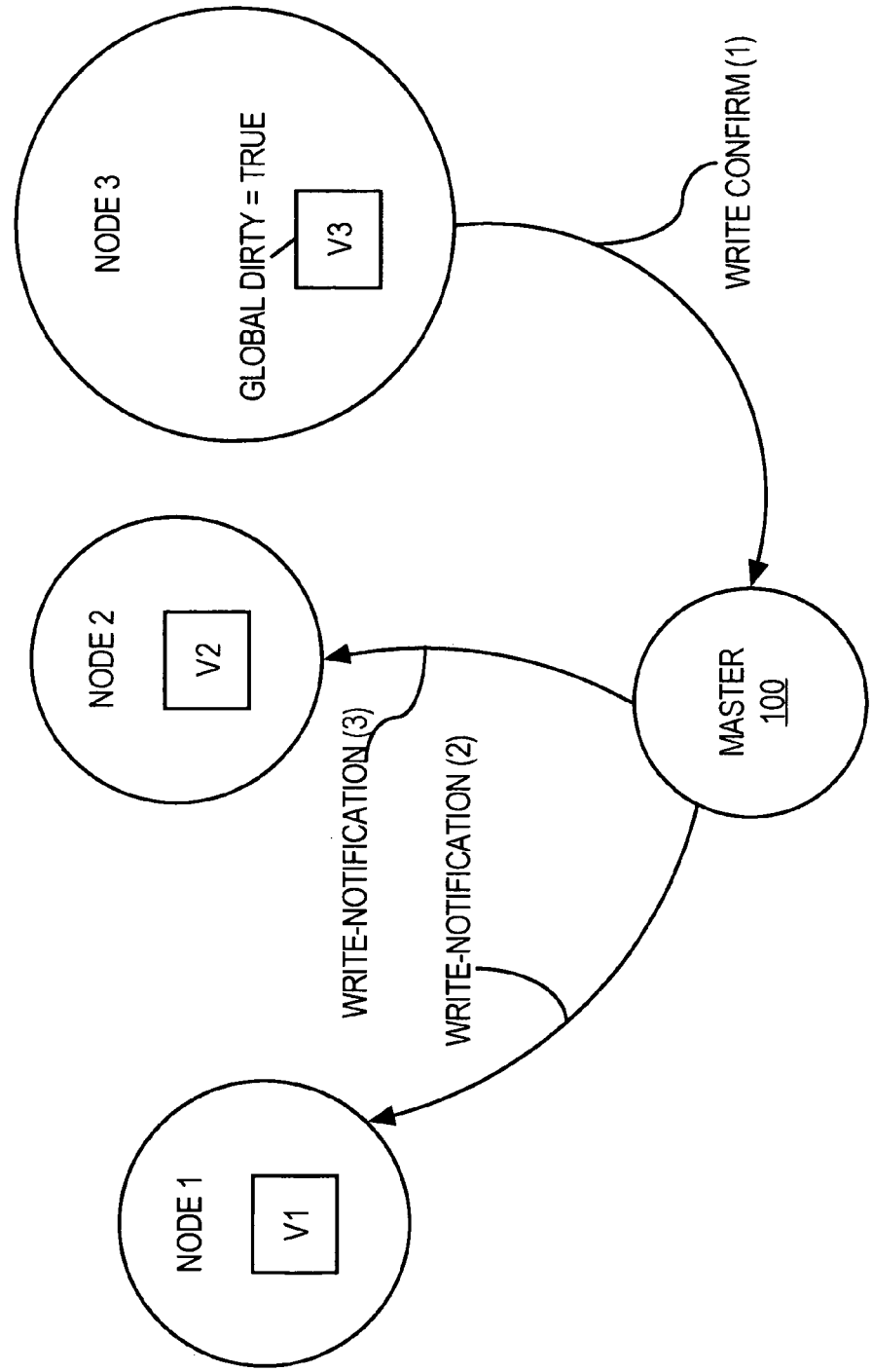
FIG. 3b is a block diagram illustrating how write-do-disk operations are coordinated in an owner-based write approach when the global dirty flag is true, according to an embodiment of the invention.

Referring to FIG. 3b, it illustrates a scenario in which the owner of a data item (node 3) desires to write a data item to persistent storage, where the global dirty flag is set to TRUE. In the illustrated scenario, nodes 1 and 2 have dirty versions V1 and V2 of the data item that are older than the version V3 stored in node 3. Similar to the scenario shown in FIG. 3a, in this scenario node 3 need not request permission to write V3 to persistent storage. However, because the global dirty flag was TRUE, node 3 sends a write-confirm message to master 100 after writing V3 to persistent storage. Master 100 then sends write-notification messages to nodes 1 and 2. After writing V3 to persistent storage, node 3 sets the global dirty flag to FALSE.

Figure 3C:
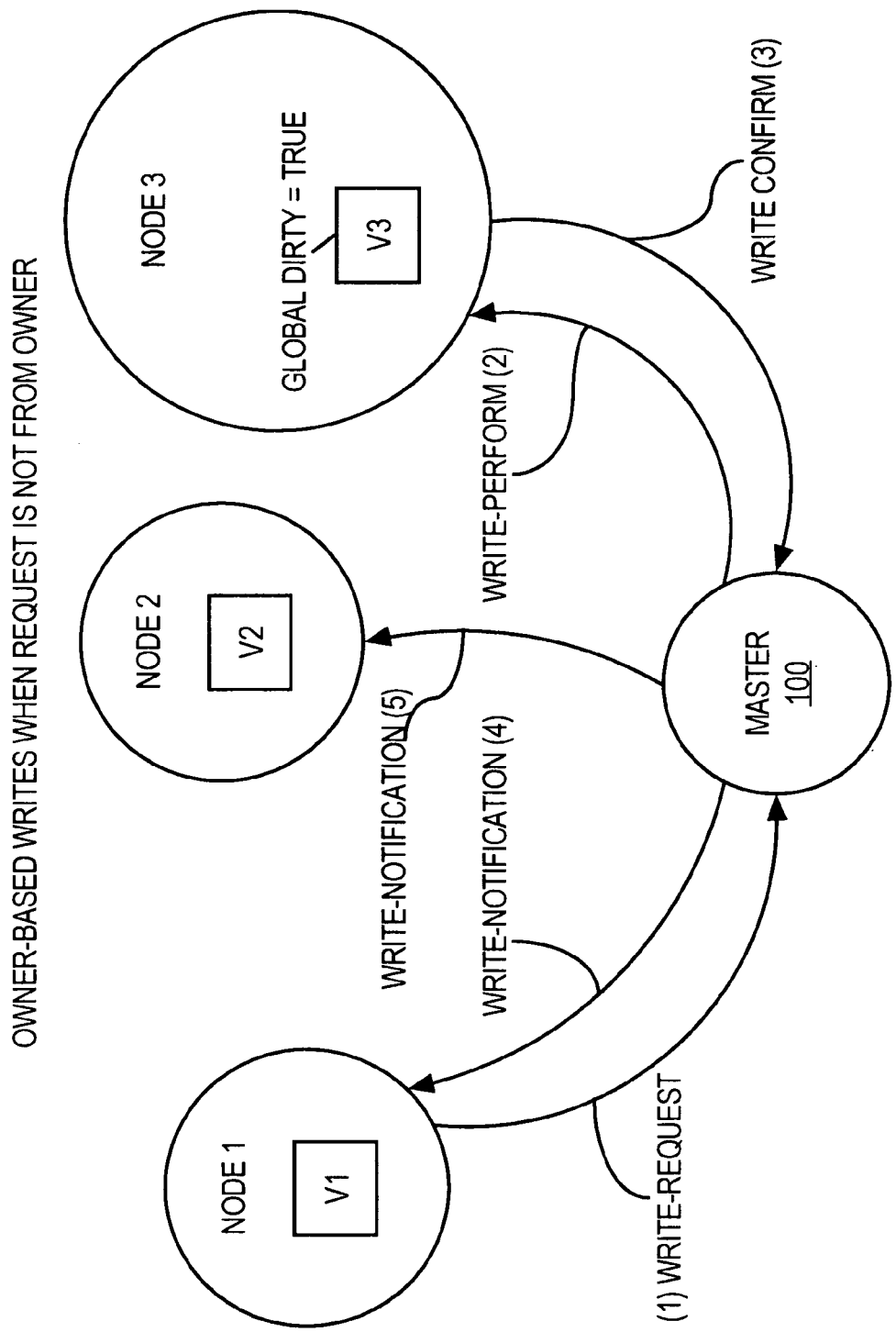
FIG. 3c is a block diagram illustrating how write-do-disk operations are coordinated in an owner-based write approach when the write request is not from the owner, according to an embodiment of the invention.

Referring to FIG. 3c, it illustrates a scenario in which a non-owner of a data item (node 1) desires the data item to be written to persistent storage. In this scenario, node 1 sends a write-request message to master 100. Master 100 then sends a write-perform message to the owner (node 3) of the data item. Node 3 writes V3 to persistent storage, sets the global dirty flag to FALSE, and sends a write-confirm message to master 100. Master 100 then sends write-notification messages to the interested nodes (nodes 1 and 2).

Role-Based Approach

The owner-based write approach avoids the need for the owner of a data item to get permission from the master of the data item before writing the data item to persistent storage. However, to avoid the possibility of two nodes attempting to write the data item to persistent storage at the same time, the ownership of the data item is not allowed to change while the data item's current owner is writing the data item to persistent storage. Consequently, in systems where the holder of an exclusive lock is considered to be the owner, the exclusive lock cannot be transferred to another node while the data item's current owner is writing the data item to persistent storage. As a result, the transfer of the modify permission to a subsequent node that desires to modify the data item is delayed until the data item is written to persistent storage. Such delays reduce the overall performance of the system. In addition, it is undesirable for the owner of a data item to have to link the data item in its dirty queue even though the owner may not have dirtied the data item.

The role-based approach separates (1) ownership of an exclusive lock in a data item from (2) permission to write the data item to persistent storage without sending a write-request. Because ownership of an exclusive lock in a data item is separated from permission to write the data item to persistent storage without sending a write-request, the exclusive lock ownership of a data item may be transferred between nodes even when a write-to-persistent storage operation is in progress.

According to the role-based approach, a lock role is assigned to each lock. The lock role is "local" if the data item could be potentially dirty only in one node's cache. Hence, when a lock on a data item is granted to a node for the first time in the entire system, the lock is granted with local role. A data item under a lock with local role can be both written to persistent storage and read from persistent storage by the node that holds the lock without master intervention.

When a data item is pinged out from a node's cache because of a lock request from a different node, the role for the lock is converted to "global" if the data item is dirty in the holding node's cache. Otherwise, the lock that is transferred with the data item remains under local role. Thus, a data item needs to be under global role only if there is at least one PI for the data item in the multi-node system.

When a PI data item or a current data item in global role needs to be written to persistent storage, its holding node sends to the master a write-request message with the version number of the data item that needs to be written. The master can forward the write request to either the node that has the current data item (X lock holder) or any PI whose version number is greater than or equal to the version number of the PI that needs to be written. When the write completes, the master sends write notifications to all nodes that have PIs that are covered by the version of the data item that is written to persistent storage.

Since the node that has the exclusive lock in global role also needs to coordinate its write-to-persistent storage operations with the master, an exclusive lock can be transferred to another node even while the data item under the exclusive lock is in the middle of being written. For the same reason, a node does not link a data item into its checkpoint or dirty queue unless it has been dirtied in that node. When a dirty data item is pinged out while it is being written under local role, the lock role is switched to global and the in-progress write is communicated to the master.

Referring to FIG. 4a, it illustrates a scenario in which the holder of a local-mode lock (node 3) desires to write a version of the data item to persistent storage. Because the lock held by node 3 is in local mode, node 3 writes the data item to persistent storage without asking permission from master 100. Node 3 also need not inform master 100 that the data item was written to persistent storage.

Figure 4B:
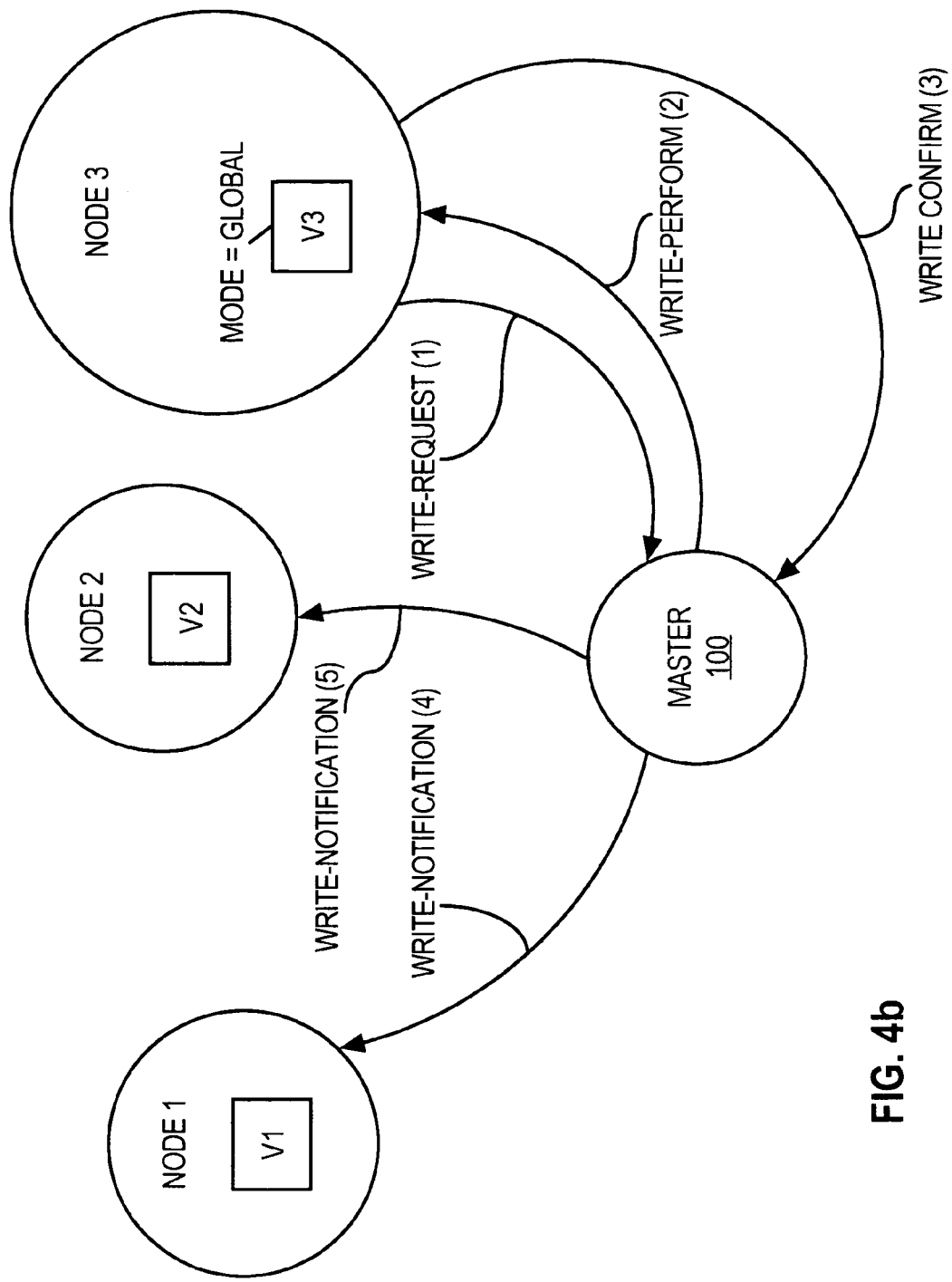
FIG. 4b is a block diagram illustrating how write-do-disk operations are coordinated in a role-based write approach when the mode is global, according to an embodiment of the invention.

Referring to FIG. 4b, it illustrates a scenario in which the holder of a global-mode lock (node 3) desires to write a version V3 of a data item to persistent storage. Because the lock mode is global, it is possible that another node is writing the data item. Therefore, node 3 sends a write-request message to master 100. In response to the write-request message, master 100 selects a node to write out the data item. Preferably, master 100 selects a node that has a version of the data item that is at least as recent as V3. In the present example, V3 is the current version of the data item. Consequently, master 100 sends back to node 3 a write-perform message.

In response to the write perform message, node 3 writes V3 to persistent storage, and sends a write-confirm message back to master 100. Master 100 then sends a write-notification message to the interested nodes (nodes 1 and 2).

If the version of the data item that is written to persistent storage is the current version, then the node that writes the data item to persistent storage also converts the lock from global mode to local mode. This conversion may be performed when the current version is written to persistent storage. The node that writes the current version to persistent storage is able to determine that the node is writing the current version based on the fact that the node holds an exclusive lock on the data item. In the present example, V3 is the current version, so after writing V3 to persistent storage, node 3 converts the mode from global to local.

Figure 4C:
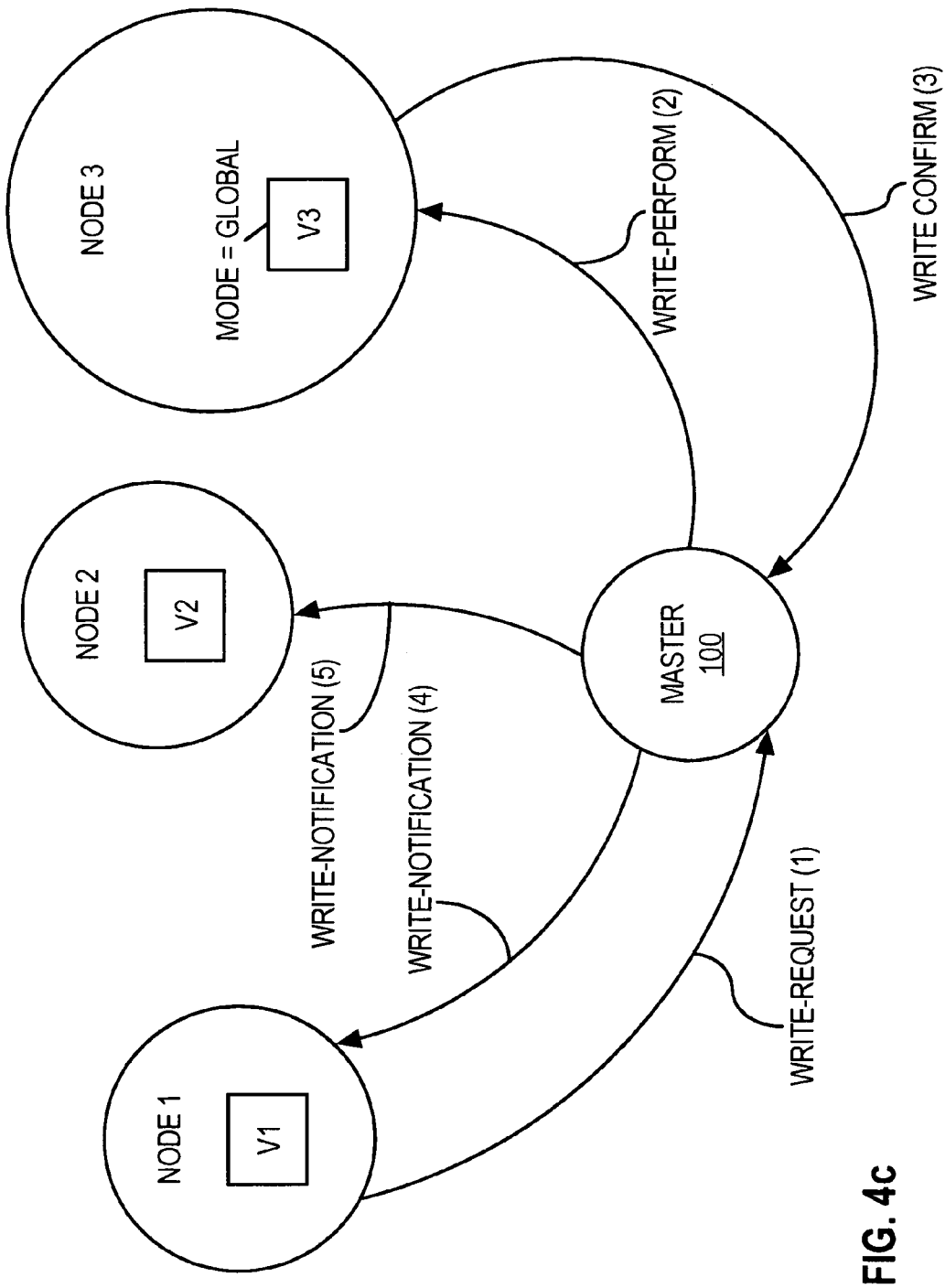
FIG. 4c is a block diagram illustrating how write-do-disk operations are coordinated in a role-based write approach when the request is not from the exclusive lock holder, according to an embodiment of the invention.

Referring to FIG. 4c, it illustrates a scenario in which a node (node 1) that is not holding the current version of a data item requests for the data item to be written to persistent storage. The sequence of events shown in FIG. 4c are the same as those in FIG. 4b, except that the write-request message comes from node 1 rather than node 3.

As illustrated in FIG. 4b, in contrast to the owner-based approach, under the role-based approach the owner of an exclusive lock on a data item must still seek permission to write the data item from the master 100 when the lock is in global mode. However, unlike the owner-based approach, a data item (and the exclusive lock thereto) may be transferred from one node to another without waiting for a write-to-persistent storage operation to complete.

For example, FIG. 4d illustrates the same scenario as FIG. 4c, except that a node (node 4) has requested exclusive ownership of the data item. Node 3 is able to transfer the data item to node 4 even when node 3 is in the process of writing V3 to persistent storage in response to the write-perform message. With the exclusive write lock, node 4 may proceed to modify the data item to create version V4. However, because the mode is global, node 4 cannot write V4 to persistent storage.

In FIG. 4c, upon receipt of the write-confirm message from node 3, master 100 sends a convert-to-local message to node 4. In response to receiving the convert-to-local message, node 4 converts the mode from global to local. After the mode has been changed back to local, node 4 can write the data item to persistent storage and read the data item from persistent storage without any permission from master 100.

In an alternative embodiment, master 100 does not send a convert-to-local message in response to the write-confirm message. Without the convert-to-local message, the mode of the exclusive lock will remain global in node 4. Because the mode is global, node 4 will send a write-request to master 100 if node 4 wishes to write V4 to persistent storage. In response to the write-request message, master 100 may send the convert-to-local message to node 4. After the mode is converted to local, node 4 may write V4 without further permission.

Delayed Write Notifications

In the scenarios presented above, it was mentioned that the sending of write-notification messages can be performed immediately to all interested nodes, or the sending may be deferred to some or all of the interested nodes. According to one embodiment, when a write-to-persistent storage operation is performed, a write-notification message is immediately sent only to those nodes that have requested a write for a PI that is covered by the write that has been performed. For example, in FIG. 1, master 100 immediately sends a write-notification message to node 1, but not to node 2.

The version number of the data item on persistent storage can later be communicated from the master to the other interested nodes using any one of a variety of techniques. For example, the version number of the data item on persistent storage can be communicated as part of (1) lock grant messages for new lock requests, or (2) ping messages when the current version of a data item needs to be sent to another node. Hence, when the other interested nodes need to write or replace their PIs, they can discard their PIs by communicating only with the local lock manager.

Batched Messages

Another technique for reducing the number of messages that are communicated between a master and interested nodes involves batching the write-request messages and the write-notification messages from and to the master into fewer larger messages in order to reduce the number of messages. For example, if node 1 desires to advance its checkpoint queue by three entries, node 1 may send a single write-request message to master 100 that identifies all three data items (and their respective versions) that must be written to persistent storage. Similarly, if node 1 is interested in three write-to-persistent storage operations that have been completed, master 100 may send a single write-confirm message to node 1 that identifies the three data items (and their respective versions) that have been written to persistent storage.

Checkpoint Queues: Managing Multiple Past Images of the Same Data Item

In the scenarios presented above, it was assumed that each node's cache has at most one PI for each data item. In reality, a data item may circulate several times through multiple nodes before some version of the data item is written to persistent storage. It would be correct to create a PI every time a dirty data item is pinged out to another node and have entries for several PIs at different positions in the dirty or checkpoint queue in a node's cache.

Figure 5:
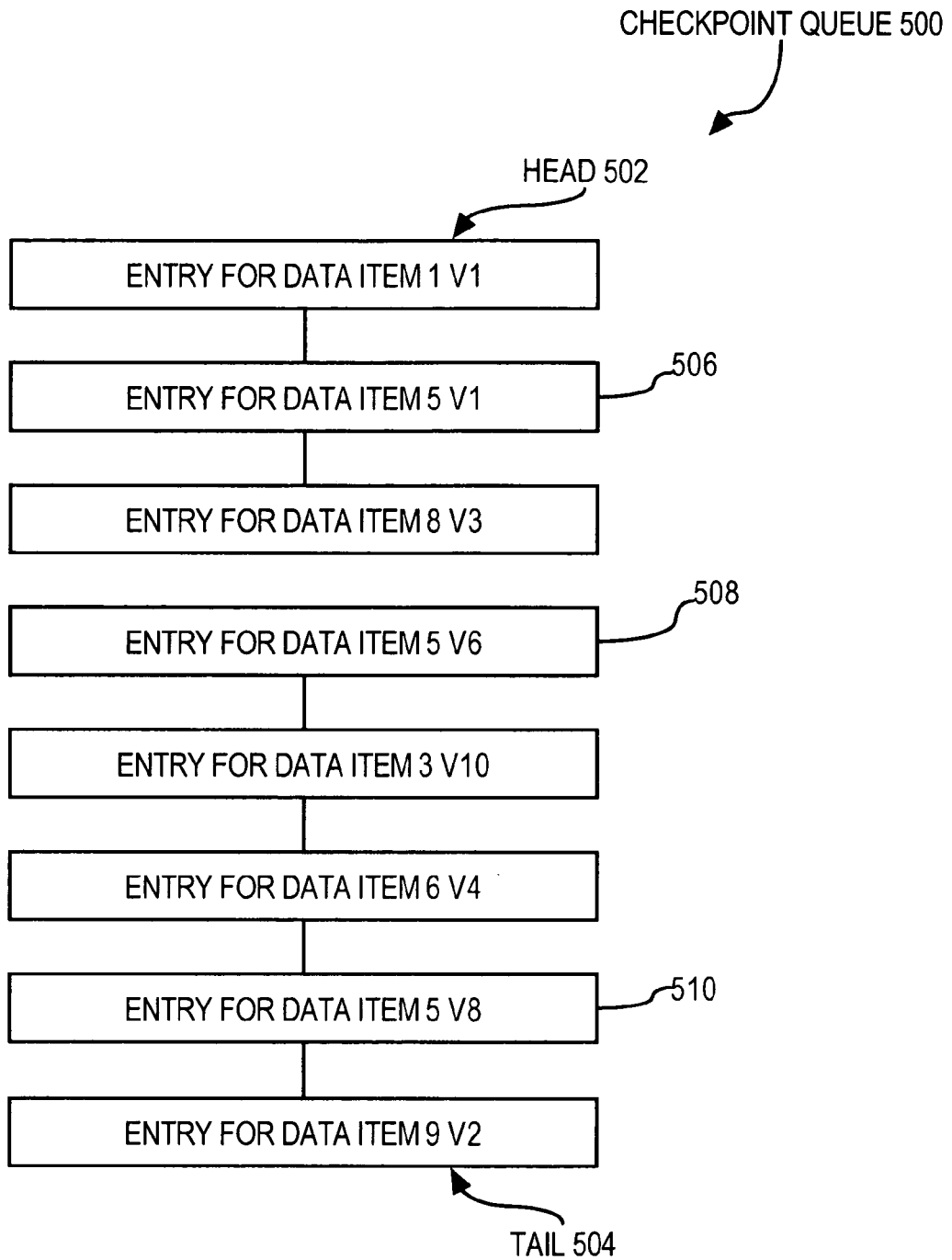
FIG. 5 is a block diagram illustrating a checkpoint queue.
Figure 6:
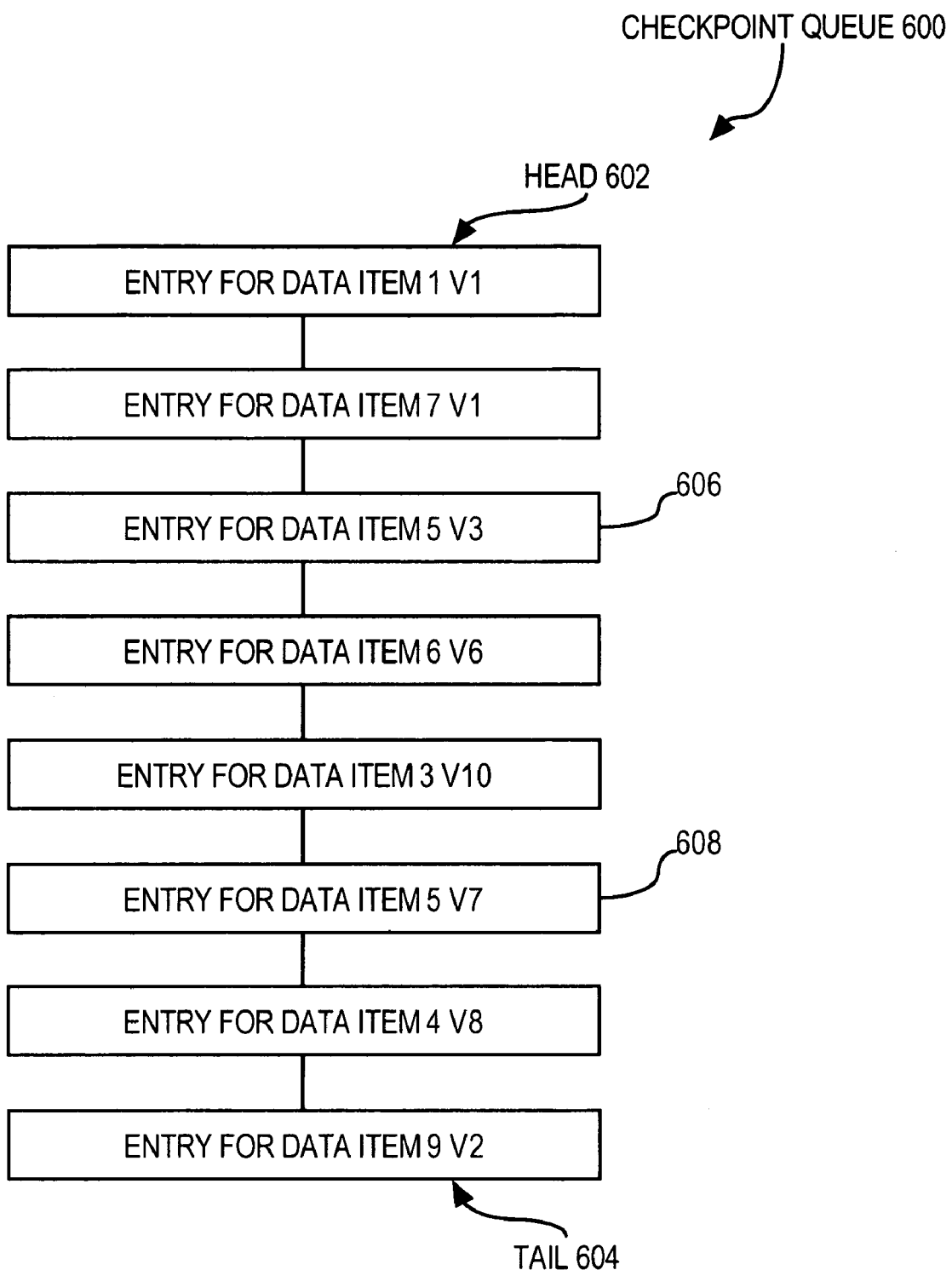
FIG. 6 is a block diagram illustrating a checkpoint queue.

For example, FIG. 5 illustrates a scenario in which the checkpoint queue 500 of a node has three entries for a particular data item (data item 5). In particular, checkpoint queue 500 has a head 502 and a tail 504 and three entries 506, 508 and 510 that correspond to versions V1, V6 and V8 of data item 5. Similarly, FIG. 6 illustrates a scenario in which the checkpoint queue 600 of another node has two entries for data item 5. In particular, entries 606 and 608 correspond to versions V3 and V7 of data item 5.

For the purpose of explanation, it shall be assumed that checkpoint queue 500 is the checkpoint queue for a node A (not shown), and that checkpoint queue 600 is the checkpoint queue for a node B (not shown).

The master of a data item is updated with the version number of the most recent PI that is created after a dirty data item is transferred to another node. Thus, when node A creates V1 of data item 5 and transfers data item 5 to another node, the master of data item 5 is updated to indicate that node A has V1. When node A subsequently creates V6 of data item 5 and transfers data item 5 to another node, the master of data item 5 is updated to indicate that node A has V6. Similarly, when node A subsequently creates V8 of data item 5 and transfers data item 5 to another node, the master of data item 5 is updated to indicate that node A has V8.

However, a PI occupies memory in the cache and cannot be replaced until it or a more recent version is written to persistent storage. Hence, when a dirty data item is transferred out of a cache, the newly created PI may be merged with (replace) the previous PI, if one exists. The checkpoint entry associated with the merged PI, however, must remain in the same position in the dirty or checkpoint queue as the entry of the earliest version that was involved in the merger, because a checkpoint cannot be considered complete until the changes that were made to the data item when the first PI was created are reflected on the persistent storage version of the data item. Further, the merged entry cannot be removed from the checkpoint queue until the latest version in the merger is covered by a write-to-disk operation.

Figure 7:
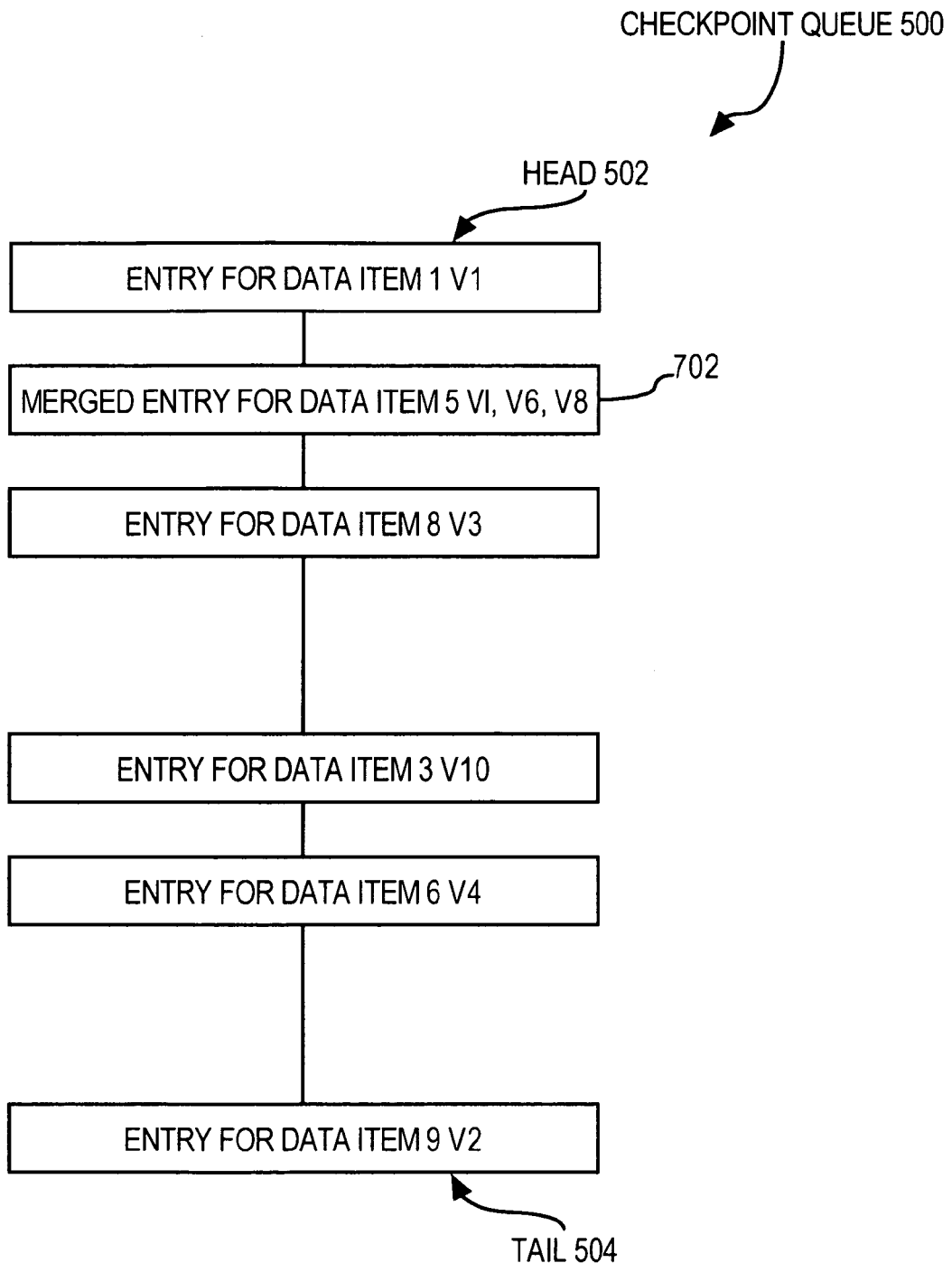
FIG. 7 is a block diagram illustrating a checkpoint queue with merged entries.

For example, FIG. 7 illustrates checkpoint queue 500 were the entries 506, 508 and 510 for versions V1, V6 and V8 of data item 5 are merged into a single entry 702. The single entry 702 is located at the position that was occupied by entry 506, because entry 506 was the earliest entry involved in the merger.

Partially-Covered Merged Entries

When PIs of a data item are merged, it is possible that when a version of the data item is written to persistent storage on a different node, the version covers some but not all of the changes that are reflected in the merged PI. For example, if node B writes V7 of data item 5 to persistent storage, then only the changes associated with V1 and V6 of the merged entry 702 are covered. The changes that are associated with V8 are not covered.

When the persistent storage version completely covers the changes contained in a merged PI, the entry for the PI can be discarded and the checkpoint can be advanced past the earliest change made in the PI. For example, if V9 of data item 5 had been written to persistent storage, then merged entry 702 could be discarded.

On the other hand, when a persistent storage write covers only some of the changes of a merged PI, then the entry for the merged PI cannot be discarded. For example, even though the writing of V7 to persistent storage would allow non-merged entries 506 and 508 to be removed from checkpoint queue 500, it does not allow the merged entry 702 to be removed from checkpoint queue 500.

Although the entry for a partially covered merged PI cannot be discarded, the entry can be moved in the dirty or checkpoint queue to the position of the entry for the version that is just after the version that was written to persistent storage. For example, after V7 of data item 5 is written to persistent storage, entry 702 can be moved to the position in checkpoint queue 500 at which the entry for V8 of data item 5 (i.e. entry 510) had been located. This allows the checkpoint to proceed until the first entry that is not covered by the written-to-disk version, without being blocked by the entry for the merged PI.

Avoiding the Creation of Partially-Covered Merged Entries

In some systems, the dirty or checkpoint queues are implemented as a linked list. It may be expensive, in terms of CPU usage, to scan the linked list and insert a merged entry in the correct position within the queue. An in-memory index can be implemented to facilitate this, but that would cause extra overhead when linking data items to the checkpoint queues.

According to one embodiment, the overhead associated with moving partially covered merged entries is avoided by avoiding the creation of partially covered moved entries. Specifically, when a merge operation is likely to create a merged entry that would be partially covered, the merge operation is not performed.

According to one embodiment, when (1) a version of a data item is being written to persistent storage, and (2) the data item is transferred between nodes, the master communicates the version number of the data item that is currently being written to persistent storage (the "being-written" version) to the node to which the data item is being transferred (the "receiving" node). The receiving node thus knows not to merge any version of the data item that is the same as or earlier than the being-written version with any version of the data item that is later than the being-written version.

Referring again to FIGS. 5 and 6, assume that node A is in the process of writing V6 of data item 5. Before the write operation is complete, node A sends data item 5 to node B, and node B modifies the received version of data item 5 to create V7 of data item 5. The master informs node B that V6 of data item 5 was written to persistent storage when the master sends a ping to node B. Consequently, node B does not merge V7 of data item 5 with V3 of data item 5, because the resulting merged data item would only be partially covered by the writing of V6. Because the writing of V6 fully covers V3, after the writing of V6 is completed, node B may discard V3, and remove entry 606 from queue 600.

Thus, while a write-to-persistent storage operation is in progress, PIs and entries associated with versions that are at least as old as the being-written version may be merged with each other, and PIs and entries associated with versions that are newer than the being-written version may be merged with each other. However, PIs associated with versions that are at least as old as the being-written version should not be merged with the PIs associated with versions that are newer than the being-written version.

Using this technique in a system where the holder of the most recent version always performs the write-to-persistent storage operation ensures that no merged PIs will ever be partially covered by a write-to-persistent storage operation. Specifically, when a node is pinged to send a data item that is undergoing a write-to-persistent storage operation, it will not merge the new version of the data item with older versions. If the data item is not undergoing a write-to-persistent storage operation, then the received data item will be the most recent version, and no other node will thereafter be asked to write an earlier version of that data item to persistent storage.

An alternative scheme to avoid writes covering partial changes is to heuristically determine when to create new checkpoint queue entries rather than merging with existing checkpoint queue entries. For example, assume that a checkpoint queue entry exists for versions V7 of data item 3. It may be necessary to determine whether to create a new entry for a new version of data item 3, or merge the new version with the existing entry. The decision of whether to merge may be decided heuristically based, for example, on how old the first change made to the existing entry is with respect to (1) the most recent change present in the redo log and (2) the earliest change made to the data item at the head of the dirty or checkpoint queue. This heuristic estimates the probability that the PI associated with the existing entry would be written (or covered by a write) fairly soon, and enables the node to extend the checkpoint past the first change in the PI.

For example, if the most recent change in the redo log corresponds to a time that is much later than V7, and the data item at the head of the checkpoint queue is associated with a time that is close to V7, then there is a higher probability that the PI associated with the existing entry will be written (or covered by a write) soon, and therefore a separate entry should be made for the new version. On the other hand, if the most recent change in the redo log corresponds to a time that is close to V7, and the data item at the head of the checkpoint queue corresponds to a time that is much earlier than V7, then there is a lower likelihood that the PI associated with the existing entry would be written (or covered by a write) soon. Therefore, the new version should be merged into the existing entry.

Single-Node-Failure Checkpoint Queues

As mentioned above, the entry at the head of a checkpoint queue determines the position, within a redo log, where recovery processing must begin after a failure. For an accurate recovery, it is safe to begin processing the redo log from the location that corresponds to the entry at the head of the checkpoint queue regardless of how many of the nodes within a cluster were involved in the failure.

According to one embodiment, a checkpoint mechanism is provided to keep track of two checkpoints for each node: a multiple-failure-checkpoint and a single-failure checkpoint. The multiple-failure-checkpoint indicates the position to begin processing the redo of the node after a multiple-node failure involving the node. The single-failure-checkpoint indicates the position to begin processing the redo log of the node after a single-node failure of the node.

As shall be described hereafter, entries may be removed from the single-failure-checkpoint queue under circumstances that do not allow them to be removed from the multiple-failure-checkpoint queue. Consequently, the single-failure-checkpoint will typically be advanced further than the multiple-failure-checkpoint. Because the single-failure checkpoint is further advanced, maintaining the single-failure-checkpoint results in less work that has to be performed to recover from a single node failure.

With respect to advancing the checkpoints, the multiple-node-failure checkpoint of the node does not change when a node transfers a dirty data item to another node. Because the data item was dirty, there is an entry for the data item in the multiple-failure-checkpoint queue. That entry remains in the multiple-failure-checkpoint queue after the dirty data item is transferred.

In contrast, the entry associated with a dirty data item is removed from the single-failure-checkpoint queue when the dirty data item is transferred to another node. It is safe to remove the entry for the transferred dirty item from the single-failure-checkpoint queue because the changes made to the dirty data item will not be lost if only the transferring node fails. In response to the failure of only the transferring node, the changes made by the transferring node are reflected in the version of the data item sent to the receiving node. Under these circumstances, the responsibility for ensuring that the changes are saved to persistent storage are transferred with the data item. Thus, even if the receiving node does not perform any further modifications to the data item, the receiving node must either (1) ensure that the changes made by the transferring node (or redo for the changes) are written to persistent storage, or (2) transfer the dirty data item (and the responsibilities) to yet another node.

The transfer of a dirty data item to another node allows the transferring node to remove the entry for the transferred data item from its single-node-failure checkpoint queue. Consequently, a node that desires to advance its single-node-failure checkpoint queue can simply transfer to another node the dirty data item that corresponds to the entry at the head of its single-node-failure checkpoint queue. The transfer of the dirty data item may be performed for this purpose even if the node that receives the dirty data item never requested the data item.

The two checkpoints may be implemented in a variety of ways, and the present invention is not limited to any particular implementation. For example, the single-failure-checkpoint queue and the multiple-failure-checkpoint queue may be maintained as two entirely separate queues. Alternatively, a single "combined" queue of entries may be maintained to serve both as the single-failure-checkpoint queue and the multiple-failure-checkpoint queue. When a combined queue is used, a pointer may be used to identify, within the combined queue, which entry is at the head of the single-failure-checkpoint queue. When entries are removed from the multiple-failure-checkpoint queue, they are removed from the combined queue. When entries are removed from the single-failure-checkpoint queue, they are marked accordingly, but are not removed from the combined queue.

Bin-Based Batching

According to the bin-based batching approach, two separate checkpoint queues are maintained in a node: a globally-dirty checkpoint queue and a locally-dirty checkpoint queue. The locally-dirty checkpoint queue of a node includes entries for data items that are dirty only in that node. The globally-dirty checkpoint queue of a node includes entries for data items that have also been dirtied in other nodes.

According to one embodiment, the entries in the globally-dirty checkpoint queue are grouped into "bins". Each bin is associated with a range of time, and contains those entries that are for versions of data items that were first dirtied within that range of time. Thus, if a merged entry corresponds to those versions of a data item that were made when the data item was dirtied at times T7, T9 and T12, then the merged entry would fall into the bin that corresponds to the time range that includes T7, since T7 is the "first-dirtied time" covered by the entry.

Figure 8:
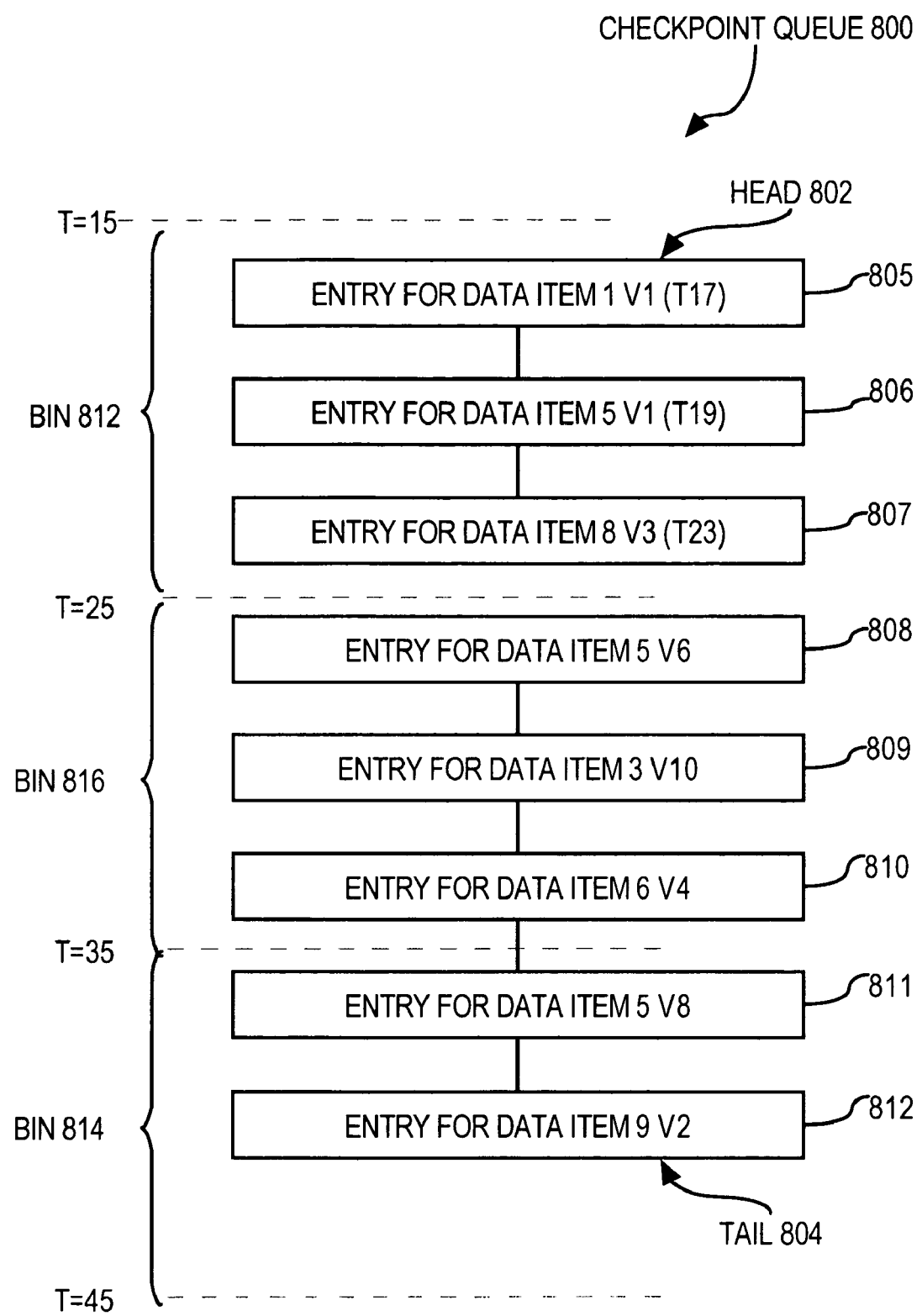
FIG. 8 is a block diagram illustrating a checkpoint queue where the entries are into bins.

For example, FIG. 8 illustrates a globally-dirty checkpoint queue 800 of a node X that has been divided into bins 812, 814 and 816. Bin 812 is associated with the time range T15 to T25 and contains entries for the globally dirty data items that have first-dirtied times between T15 and T25. Bin 814 is associated with the time range T16 to T35 and contains entries for the globally dirty data items that have first-dirtied times between T16 and T35. Bin 816 is associated with the time range T36 to T45 and contains entries for the globally dirty data items that have first-dirtied times between T36 and T45.

According to an embodiment, each bin is assigned a version number. The version number of a bin may be, for example, the first-dirtied time value of any entry in that bin. For example, bin 812 includes three entries 805, 806 and 807 that are respectively associated with V1 of data item 1, V1 of data item 5, and V3 of data item 8. Assume that V1 of data item 1, V1 of data item 5, and V3 of data item 8 were first dirtied at times T17, T19 and T23, respectively. In this scenario, T23 is the highest first-dirtied time of any PI in bin 812. Hence, bin 812 would be assigned the version number T23.

According to one embodiment, the number of write-request messages is reduced by having the persistent storage writing subsystem issue write-requests to a master on a bin-by-bin basis, rather than on an entry-by-entry basis. For example, to advance checkpoint queue 800, the node X sends the master a single write-request message for the writing of the data items that correspond to all entries in bin 812. The write-request message may simply identify bin 812 by the version number T23 (and not the specific entries within the bin). In response to the write-request, the master sends write-perform messages to the current lock holders of all data items that have a PI whose first-dirtied time is less than or equal to the version number specified in the write-request. In the present example, the master sends write-perform messages to the current lock holders of all data items that have a PI whose first-dirtied time is less than or equal to T23.

When each node finishes writing to disk all dirty data items whose earliest change is on or before T23, the node sends a write-confirm message to the master. When the master receives write-confirm messages from all nodes to which write-perform messages were sent, the master sends write-notification messages to all nodes to inform them that the requested writes have been completed. In response, every node can empty the corresponding bin. For example, when node X is informed that all data items with first-dirtied times on or before T23 have been written to disk, then node X may empty bin 812. Bin 812 may be emptied by (1) discarding all entries that do not cover changes made after T23, and (2) moving to other bins those entries within bin 812 that do cover changes made after T23. For example, if entry 806 was a merged entry that covered changes made at T19 and T40, then when bin 812 is emptied, entry 806 is moved to bin 814.

According to one embodiment, the master tracks both (1) the first-dirtied time of a Pi and (2) the version number associated with the last change to the PI (the "last-dirtied time"). For example, for merged entry 702, the master would know that merged entry is for version V8 (the latest version in the merged entry) and version V1 (the earliest version in the merged entry). In such an embodiment, when a node receives a write-notification from the master with a version number of a bin, it empties the bin by discarding all entries in the bin whose last-dirtied times are less than or equal to the bin version number, and (2) moving all entries in the bin whose last-dirtied times are greater than the bin version number into the next bin in the queue. In this scheme, when a new PI is created because a dirty data item is transferred to another node, the entry for the new PI can always replace the entry for the older PI, if any, in the older PI's bin because the entry for the resulting merged PI can then be easily moved to its appropriate bin when there is a write that partially covers changes contained in the PI.

Bin-based batching is generally more suitable to multi-node systems that use a global master rather than a distributed lock manager. The messages to the current lock holders can be easily batched because they are generated at the same time. In essence, instead of tracking the version numbers of data items that are on persistent storage and the version numbers of data items that are in the process of being written, the master also tracks the persistent storage version number for all globally dirty data items, much like a checkpoint record tracks the changes for all the dirty data items in a node.

Recovery

It is important to keep track of the write-to-disk operations that are performed in a multi-node system. Such information is critical, for example, for determining which entries can be removed from checkpoint queues, and for determining whether past images of data items can be written-to-disk and/or deallocated ("flushed") from cache. Specifically, a version of a data item should never be written to disk if a later version of the data item has already been written to disk. Further PI versions of a data item may be flushed from cache when a more recent version of the data item has been written to disk.

Under certain circumstances, it can be unclear whether a write-to-disk operation is successfully performed. For example, if a node writing a data item to disk fails during the write operation, it may be unclear whether the failure occurred before or after the write operation was successfully completed. Similarly, if the node on which the master of a particular data item resides fails, the failure may result in a loss of information about the data item. Such information may include information that indicates the last version of the data item to be written to disk.

When a situation occurs where it is unclear whether a write-to-disk operation was successfully performed, the issue may be resolved by scanning the data items on disk to determine their versions. However, scanning the disk as part of the recovery operation would consume a significant amount of time and resources, and may unduly delay the availability of the data.

According to one aspect of the invention, the need to scan the on-disk data items is avoided by (1) if it is unclear whether a particular version of a data item has been written to disk and the recovery information (e.g. redo log) indicates that the particular version was written to disk, causing the recovery process to assume that the particular data item was successfully written to disk, and (2) marking all earlier cached versions of that data item as "suspect". After the recovery operation, the system may then proceed under the opposite assumption. Specifically, the system proceeds under the assumption that the particular version of the data item was not written to disk. However, prior to writing any suspect version of the data item to disk, the system reads the version of the data item that resides on disk. If the on-disk version of the data item is more recent, then the write-to-disk operation is not performed, and the master is informed of which version is on disk. Optionally, the master then sends write-notification messages to all nodes that hold versions that are covered by the version that is on the disk. On the other hand, the data item is recovered.

Similarly, when a node requests the current version of a data item, the requesting node cannot be supplied a suspect version of the data item because the disk may contain a more recent version of the data item. Instead, the on-disk version of the data item is read from disk. If the version of the data item that is read from disk is the most recent version, then that version is provided to the requesting node. If the on-disk version of the data item is not the most recent version, then the most recent version is created based on the recovery information maintained in the redo log of the node that had failed.

Managing Checkpoints without Retaining Past Images

In many of the scenarios given above, it was assumed that each node is configured to retain a PI until the PI is covered by a write-to-disk operation. However, according to one embodiment of the invention, such PIs are not retained.

Specifically, each node maintains a globally-dirty checkpoint queue and a locally-dirty checkpoint queue. The dirty data items associated with the entries in the locally-dirty checkpoint queue are retained until covered by a write-to-disk operation. However, the PIs associated with the entries in the globally-dirty checkpoint queue need not be retained in that manner.

In this embodiment, the right to perform write-to-disk operations is tied to the mode of the lock held on the data item, as described above. Specifically, a node has the right to perform a write-to-disk operation for a data item if (1) the node holds the exclusive lock for the data item, or (2) no node holds the exclusive lock for the data item, and this node was the most recent node to hold the exclusive lock.

Since a node will have the exclusive lock for all data items that are locally dirty, the node will be able to write the data items associated with the locally-dirty queue to disk without master intervention. The node may also have an exclusive lock, or have held the most recent exclusive lock, for a data item associated with an entry in the globally-dirty queue, and therefore be able to write that data item to disk without master intervention.

Because the node does not retain a PI when a dirty data item is pinged out of the cache, special recovery processing is required. Specifically, when the current version of the data item is lost during data item transfer or due to node failure, the system applies changes from the merged redo logs of all nodes to the data item on persistent storage in order to reconstruct the current version of the data item. The location, within each redo log, where recovery processing must begin is determined by a checkpoint associated with the node. A checkpoint in a node cannot be considered complete unless a version of the data item containing changes made in the node prior to the checkpoint is on persistent storage. Hence, when a dirty data item is pinged out to another node, rather than retaining a past image of the data item in any checkpoint queue, the data item itself may be discarded, and the data item header or control block is linked into the globally-dirty queue.

The globally-dirty queue is ordered by the first-dirtied times associated with the entries and is similar to the locally-dirty queue, except that there is no real data item associated retained for each of the entries (i.e. the data item's contents are not present in the cache of the node). The checkpoint in a node will be the lower of the first-dirtied time of the entry at the head of the locally-dirty queue and the first-dirtied time of the entry at the head of the globally-dirty queue.

When a node wants to advance its checkpoint, it can write the data items in the locally-dirty queue without master intervention (because there is never a possibility of two nodes writing the same data item at the same time) or send a write request to the master for writing out the data item at the owner node that corresponds to a more current version of the data item header in the globally-dirty queue.

According to an alternative embodiment, two checkpoint records are stored in each node (one for each queue). The first checkpoint record would indicate a time TX, where all changes made to data items that are presently dirty in the node's cache prior to TX have been recorded on the version of the data item that is on persistent storage. The second checkpoint record would consist of the list of data items, along with the version numbers of the first change made in this node, that were once dirtied in this node but have since been pinged out and not written to persistent storage. The cache loses track of the dirty data item once it has been pinged out, while still leaving the lock open in the master (i.e. the locks are not closed until there is a write notification).

On a node failure, the starting position for scanning the redo log on the failed node is computed by determining the lesser of (1) the position in the log as determined by the first checkpoint record (call it a local checkpoint record) and (2) the positions in the log as determined by the earliest change made to the list of the data items in the second checkpoint record (which may be considered that particular node's part of a global checkpoint record).

During recovery, only those log records that correspond to the data items present in the global checkpoint record need to be considered for potential redo for the portion of the log between the global checkpoint record of a node to the local checkpoint record of the node (assuming that the global checkpoint record is behind the local checkpoint record). Once the local checkpoint record is reached, all log records need to be considered for potential redo until the end of the log is reached.

This scheme is superior to prior approaches in that it limits the list of data items in the second checkpoint record to only data items that had been previously dirtied in this node (as opposed to all dirty data items in the entire system). Second, each node's global checkpoint record can be written independent of other nodes (i.e. there is no need for coordinating a global master or GLM checkpoint). Finally, the portion of each node's redo log that needs to be scanned during recovery is always shorter because the redo log for every node does not need to be scanned from the earliest unwritten change in the entire system.

Further, prior persistent storage write protocols, in the presence of a global cache, assume access to a synchronized global clock, where values from the clock are used as log sequence numbers (LSNs). The techniques presented herein do not need access to a synchronized global clock. Further, prior techniques require a global master (GLM) that maintains lock coherency and the recovery sequence numbers of the dirty data items in the cluster. In addition, prior techniques cannot be easily extended to systems where the master is distributed across several nodes (DLM).

Hardware Overview

Figure 9:
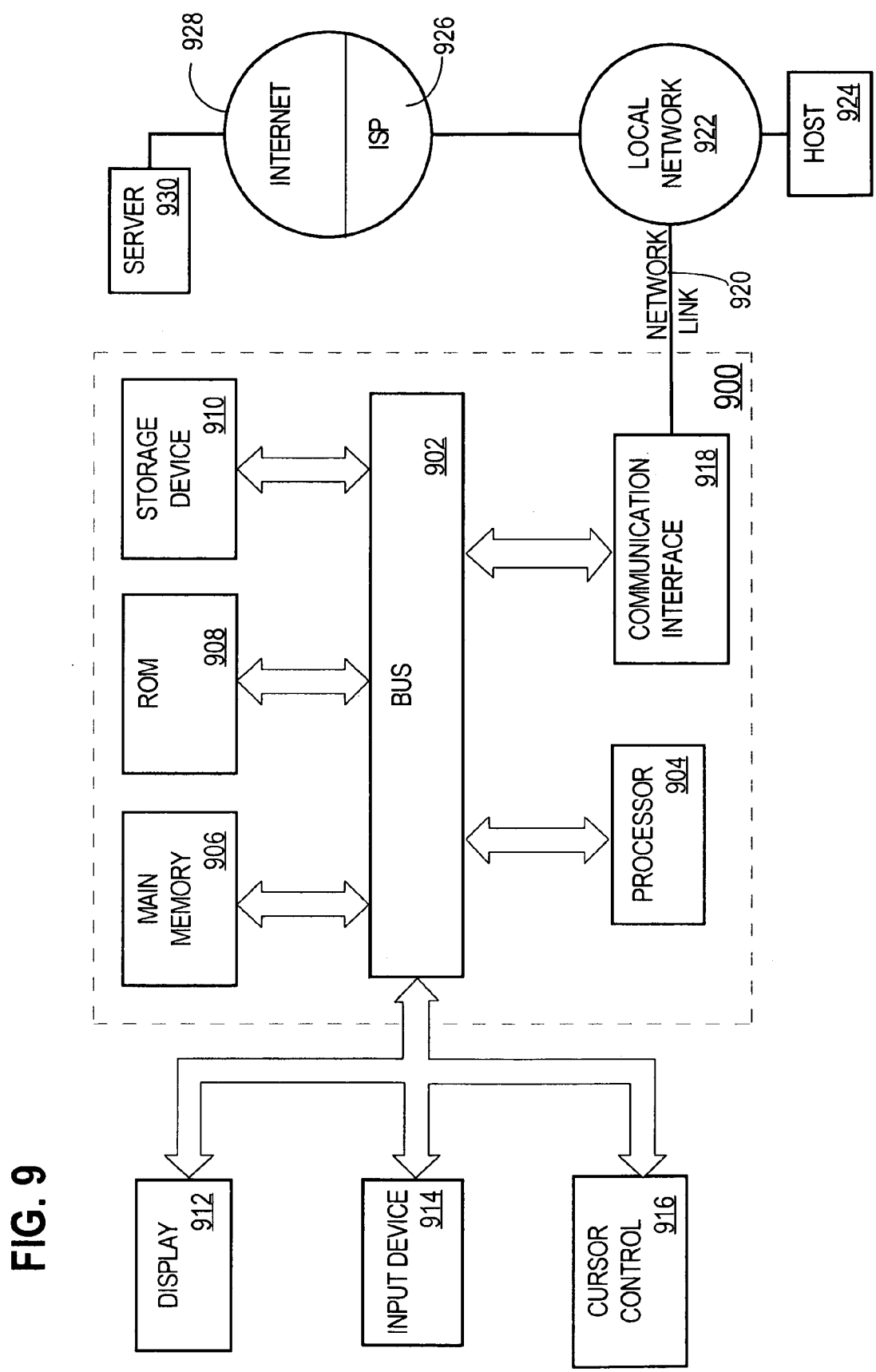
FIG. 9 is a block diagram illustrating a computer system on which embodiments of the invention may be implemented.

FIG. 9 is a data item diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic persistent storage or optical persistent storage, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, and volatile media. Non-volatile media includes, for example, optical or magnetic persistent storages, such as storage device 910. Volatile media includes dynamic memory, such as main memory 906. Transmission media includes coaxial cables, copper wire and fiber optics, including the wires that comprise bus 902.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for coordinating writing of data items to persistent storage, the method comprising the steps of:
   maintaining within a first node a first queue for dirty data items that need to be written to persistent storage;
   maintaining within the first node a second queue for dirty data items that need to be written to persistent storage;
   moving entries from said first queue to said second queue when the dirty data items corresponding to the entries need to be transferred for use by a second node;
   when selecting which data items to write to persistent storage, assigning priority to data items that correspond to entries in said second queue over data items that correspond to entries in said first queue; and
   after selecting which data items to write to persistent storage, writing the selected items to persistent storage.

2. The method of claim 1 wherein the step of moving entries includes moving an entry from said first queue to said second queue in response to a message received by said first node, wherein said message indicates that another node has requested the data item that corresponds to said entry.

3. A method for coordinating writing of data items to persistent storage, the method comprising the steps of:
   maintaining a forced-write count for each of said data items;
   incrementing the forced-write count of a data item whenever the data item is written to persistent storage by one node for transfer of the data item to another node;
   selecting which dirty data items to write to persistent storage based on the write counts associated with the data items;
   after selecting which dirty data items to write to persistent storage, writing the selected items to persistent storage;
   storing dirty data items that have forced-write counts at or above a certain threshold in a particular queue; and
   when selecting dirty data items to write to persistent storage, giving priority to data items stored in said particular queue.

4. A computer-readable storage medium carrying instructions for coordinating writing of data items to persistent storage, the instructions when executed cause the comprising computer to perform the steps of:
   maintaining within a first node a first queue for dirty data items that need to be written to persistent storage;
   maintaining within the first node a second queue for dirty data items that need to be written to persistent storage;
   moving entries from said first queue to said second queue when the dirty data items corresponding to the entries need to be transferred for use by a second node;
   when selecting which data items to write to persistent storage, assigning priority to data items that correspond to entries in said second queue over data items that correspond to entries in said first queue; and
   after selecting which data items to write to persistent storage, writing the selected items to persistent storage.

5. The computer-readable storage medium of claim 4 wherein the step of moving entries includes moving an entry from said first queue to said second queue in response to a message received by said first node, wherein said message indicates that another node has requested the data item that corresponds to said entry.

6. A computer-readable storage medium carrying instructions for coordinating writing of data items to persistent storage, the instructions when executed cause the computer to perform the steps of:
   maintaining a forced-write count for each of said data items;
   incrementing the forced-write count of a data item whenever the data item is written to persistent storage by one node for transfer of the data item to another node;
   selecting which dirty data items to write to persistent storage based on the write counts associated with the data items;
   after selecting which dirty data items to write to persistent storage, writing the selected items to persistent storage;
   storing dirty data items that have forced-write counts at or above a certain threshold in a particular queue; and
   when selecting dirty data items to write to persistent storage, giving priority to data items stored in said particular queue.

* * * * *

UNITED STATES PATENT AND TRADEMARK OFFICE
CERTIFICATE OF CORRECTION

PATENT NO. : 7,577,690 B2  Page 1 of 1
APPLICATION NO. : 11/405805
DATED : August 18, 2009
INVENTOR(S) : Sashikanth Chandrasekaran et al.

It is certified that error appears in the above-identified patent and that said Letters Patent is hereby corrected as shown below:

On Title page, in field (56), in column 2, under "Other Publications", line 2, delete "recieved" and insert -- received --, therefor.

Title page 2, in column 2, under "Other Publications", line 14-15, delete "Mangement" and insert -- Management --, therefor.

Title page 2, in column 2, under "Other Publications", line 19, delete "XP 00455787," and insert -- XP 000455787, --, therefor.

Title page 2, in column 2, under "Other Publications", line 36, delete "Enviroment"," and insert -- Environment", --, therefor.

In column 4, line 34, delete "invention." and insert -- invention; --, therefor.

In column 4, line 53, delete "are into" and insert -- are batched into --, therefor.

In column 5, line 57, delete "storage storage." and insert -- storage. --, therefor.

In column 9, line 16, delete "write-message" and insert -- write-confirm message --, therefor.

In column 10, line 13, delete "checkpoint" and insert -- dirty or checkpoint --, therefor.

In column 18, line 44, delete "Pi" and insert -- PI --, therefor.

In column 19, line 17, delete "Further" and insert -- Further, --, therefor.

In column 24, line 18, in claim 4, delete "the comprising" and insert -- the --, therefor.

Signed and Sealed this

Twenty-fourth Day of August, 2010

David J. Kappos
*Director of the United States Patent and Trademark Office*